(12) United States Patent
Caron Kardos et al.

(10) Patent No.: US 11,471,736 B2
(45) Date of Patent: Oct. 18, 2022

(54) 3D BRAIDING MATERIALS AND 3D BRAIDING METHODS FOR SPORTING IMPLEMENTS

(71) Applicant: Bauer Hockey Ltd., Blainville (CA)

(72) Inventors: Jean-Frédérik Caron Kardos, Lorraine (CA); Mathieu Ducharme, Prevost (CA)

(73) Assignee: Bauer Hockey, LLC, Exeter, NH (US)

( * ) Notice: Subject to any disclaimer, the term of this patent is extended or adjusted under 35 U.S.C. 154(b) by 0 days.

(21) Appl. No.: 17/075,171

(22) Filed: Oct. 20, 2020

(65) Prior Publication Data
US 2021/0113899 A1 Apr. 22, 2021

Related U.S. Application Data

(63) Continuation-in-part of application No. 15/448,769, filed on Mar. 3, 2017, now Pat. No. 10,857,436.
(Continued)

(51) Int. Cl.
*A63B 60/48* (2015.01)
*B29C 70/24* (2006.01)
(Continued)

(52) U.S. Cl.
CPC .............. *A63B 60/48* (2015.10); *A63B 59/70* (2015.10); *B29C 70/222* (2013.01); *B32B 5/024* (2013.01);
(Continued)

(58) Field of Classification Search
None
See application file for complete search history.

(56) References Cited

U.S. PATENT DOCUMENTS 3,818,951 A 6/1974 Greenwood
4,055,697 A 10/1977 Schmanski
(Continued)

FOREIGN PATENT DOCUMENTS

CA 2020314 A1 12/1991
CN 2768849 Y 4/2006
(Continued)

OTHER PUBLICATIONS

Machine translation of JPH02-305580 (Year: 1990).*
(Continued)

*Primary Examiner* — Shawn Mckinnon
(74) *Attorney, Agent, or Firm* — Banner & Witcoff, Ltd.

(57) ABSTRACT

Methods for fabricating a 3D braided material and exemplary 3D braided material for sporting implements are disclosed. The exemplary braids can be incorporated into any sporting implements, such as, baseball bats, lacrosse sticks, hockey sticks, rackets, helmets, and other protective equipment. The example sporting implement can be constructed, partially or entirely, with a braided three dimensional structure. The 3D braided material can be a multi-directional layup having tows oriented in three directions (X, Y and Z) and also at any angle created by the combination of two or three directions. A single woven preform can be formed that can have a near net shape of the formed product, with the fibers oriented in a way that will be optimal for the particular application.

8 Claims, 21 Drawing Sheets

Related U.S. Application Data

(60) Provisional application No. 62/303,756, filed on Mar. 4, 2016.

(51) Int. Cl.
| | | |
|---|---|---|
| *D03D 25/00* | (2006.01) | |
| *B32B 5/02* | (2006.01) | |
| *A63B 59/70* | (2015.01) | |
| *B29C 70/22* | (2006.01) | |
| *B29L 31/52* | (2006.01) | |
| *A63B 102/14* | (2015.01) | |
| *A63B 102/24* | (2015.01) | |
| *A63B 102/18* | (2015.01) | |

(52) U.S. Cl.
CPC ........ *D03D 25/005* (2013.01); *A63B 2102/14* (2015.10); *A63B 2102/18* (2015.10); *A63B 2102/24* (2015.10); *A63B 2209/023* (2013.01); *B29L 2031/52* (2013.01); *D10B 2507/00* (2013.01)

(56) References Cited

U.S. PATENT DOCUMENTS

| | | | |
|---|---|---|---|
| 4,119,748 | A | 10/1978 | Verbauwhede et al. |
| 4,725,485 | A | 2/1988 | Hirokawa |
| 4,868,038 | A | 9/1989 | McCullough, Jr. et al. |
| 5,137,058 | A | 8/1992 | Anahara et al. |
| 5,173,358 | A | 12/1992 | Anahara et al. |
| 5,236,020 | A | 8/1993 | Sakatani et al. |
| 5,407,195 | A | 4/1995 | Tiitola et al. |
| 5,413,837 | A | 5/1995 | Rock et al. |
| 5,540,877 | A | 7/1996 | Repetto et al. |
| 5,653,646 | A | 8/1997 | Negishi et al. |
| 6,129,122 | A | 10/2000 | Bilisik |
| 6,184,161 | B1 | 2/2001 | Verpoest |
| 6,270,426 | B1 | 8/2001 | Matsumoto |
| 6,315,007 | B1 | 11/2001 | Mohamed et al. |
| 6,485,376 | B1 | 11/2002 | Hisamatsu |
| 6,723,012 | B1 | 4/2004 | Sutherland |
| 6,748,601 | B2 | 6/2004 | LaShoto et al. |
| 7,138,345 | B2 | 11/2006 | Wadahara et al. |
| 7,232,388 | B2 | 6/2007 | Sutherland et al. |
| 7,611,997 | B2 | 11/2009 | Wigent, III |
| 7,628,710 | B2 | 12/2009 | Kumamoto |
| 7,888,274 | B2 | 2/2011 | Tsuji et al. |
| 7,943,535 | B2 | 5/2011 | Goering et al. |
| 8,114,792 | B2 | 2/2012 | Kuang et al. |
| 8,312,827 | B1 | 11/2012 | Free |
| 8,677,599 | B2 | 3/2014 | Gans |
| 9,005,755 | B2 | 4/2015 | Ledford et al. |
| 2002/0082112 | A1 | 6/2002 | Unosawa et al. |
| 2006/0060257 | A1 | 3/2006 | Iwashita |
| 2008/0193709 | A1 | 8/2008 | Han |
| 2008/0261014 | A1 | 10/2008 | McGuire et al. |
| 2008/0277047 | A1 | 11/2008 | Kubota et al. |
| 2008/0287228 | A1 | 11/2008 | Giannetti |
| 2010/0323574 | A1 | 12/2010 | Dunleavy |
| 2011/0182743 | A1 | 7/2011 | Naik |
| 2011/0277869 | A1 | 11/2011 | Coupe et al. |
| 2013/0065714 | A1 | 3/2013 | Avnery et al. |
| 2013/0143689 | A1 | 6/2013 | Nakajima |
| 2013/0225022 | A1 | 8/2013 | Tam et al. |
| 2013/0309490 | A1 | 11/2013 | Seike et al. |
| 2014/0283671 | A1 | 9/2014 | Head et al. |
| 2014/0322504 | A1 | 10/2014 | Narimatsu et al. |
| 2014/0342630 | A1 | 11/2014 | Amtmann et al. |
| 2014/0360618 | A1 | 12/2014 | Shan et al. |
| 2015/0111457 | A1 | 4/2015 | Khokar |

FOREIGN PATENT DOCUMENTS

| | | |
|---|---|---|
| DE | 102012211570 A1 | 8/2013 |
| EP | 0341575 A2 | 11/1989 |
| EP | 0687315 A1 | 12/1995 |
| GB | 2305942 A | 4/1997 |
| GB | 2496583 A | 5/2013 |
| JP | H02 305580 A | 12/1990 |
| JP | H09157993 A | 6/1997 |
| JP | 2008307692 A | 12/2008 |
| WO | 9501820 A1 | 1/1995 |
| WO | 0138622 A1 | 5/2001 |
| WO | 2010115538 A1 | 10/2010 |
| WO | WO2011127813 | * 10/2011 |

OTHER PUBLICATIONS

Machine translation of WO2011127813 (Year: 2011).*
Aug. 11, 2017—(PCT) International Search Report and Written Opinion—App PCT/US2017/020630.
Kadir Bilisik—"Multaxis three-dimensional weaving for composites: A review", Textile Research Journal, vol. 82, No. 7 Mar. 1, 2012, pp. 725-743.
Oct. 12, 2018—(EP) European Action—App 17714579.4.
Sep. 9, 2020—(EP) Office Action Appn 17714579.4.
Jun. 20, 2017—Partial International Search Report—App. No. PCT/US2017/020630.
Apr. 7, 2020—(CA) Office Action—App. No. 3014768.
Apr. 28, 2022—(EP) Partial Search Report—App. No. EP21203246.0.
Aug. 8, 2022—(EP) Search Report—App. No. EP21203246.0.

* cited by examiner

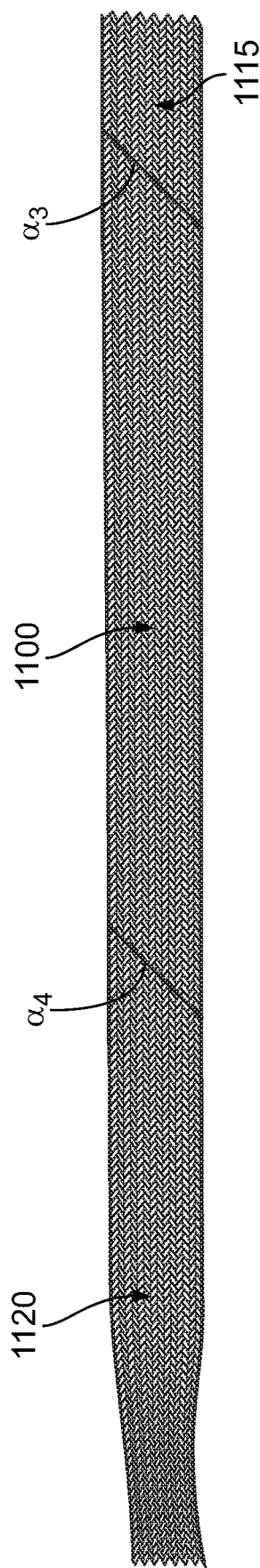
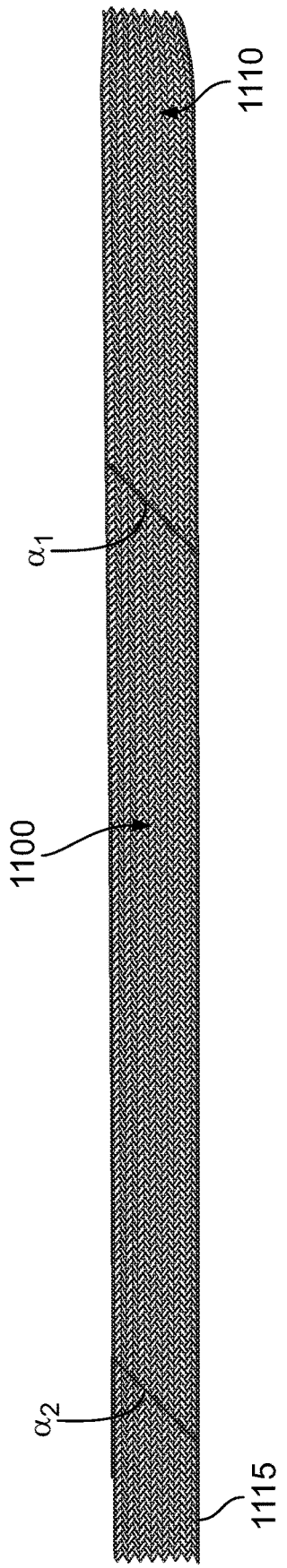
FIG. 11A
FIG. 11B

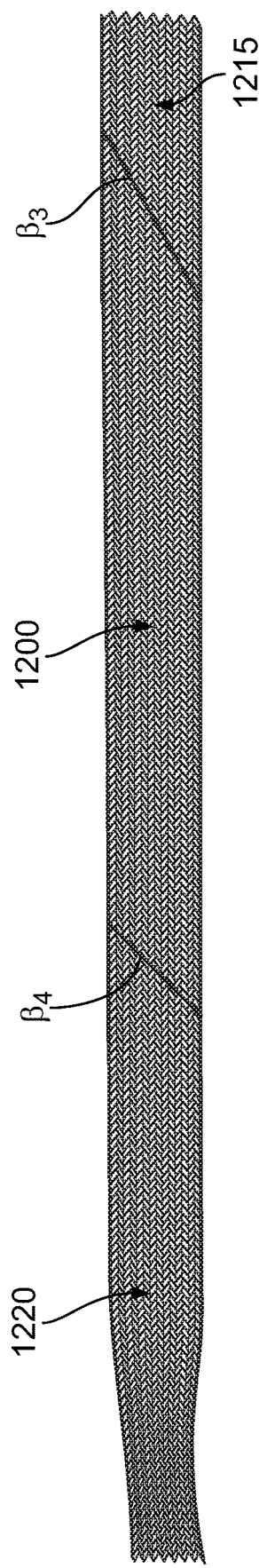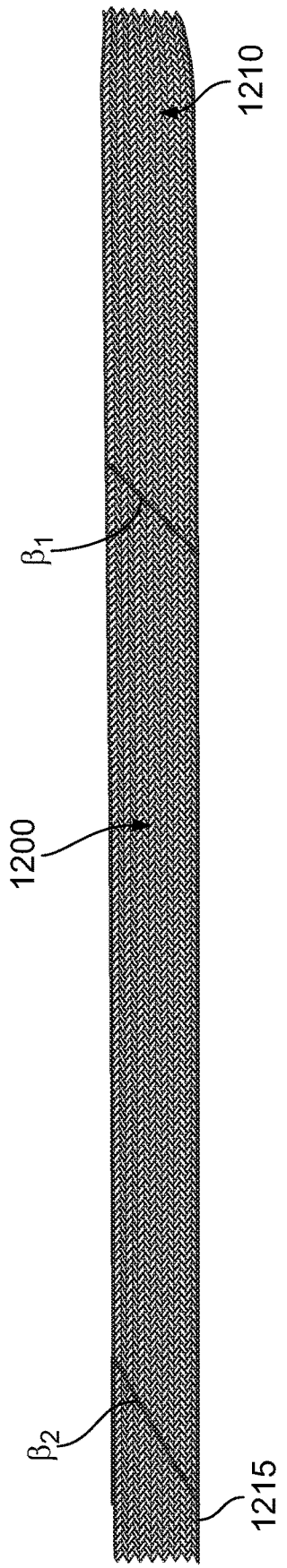
FIG. 12C
FIG. 12D

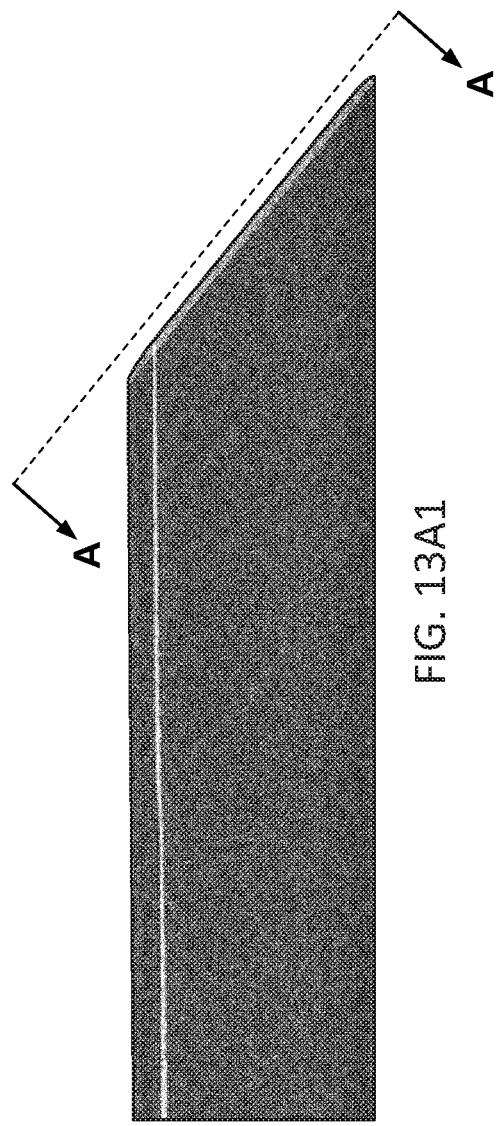
FIG. 13A1

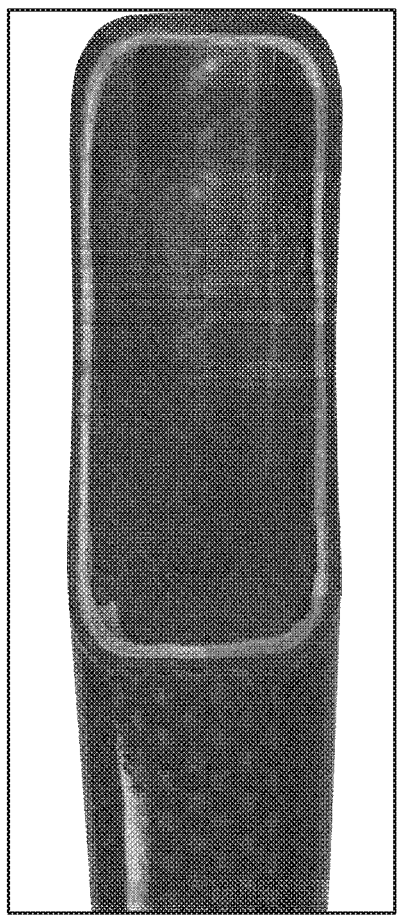
FIG. 13A2
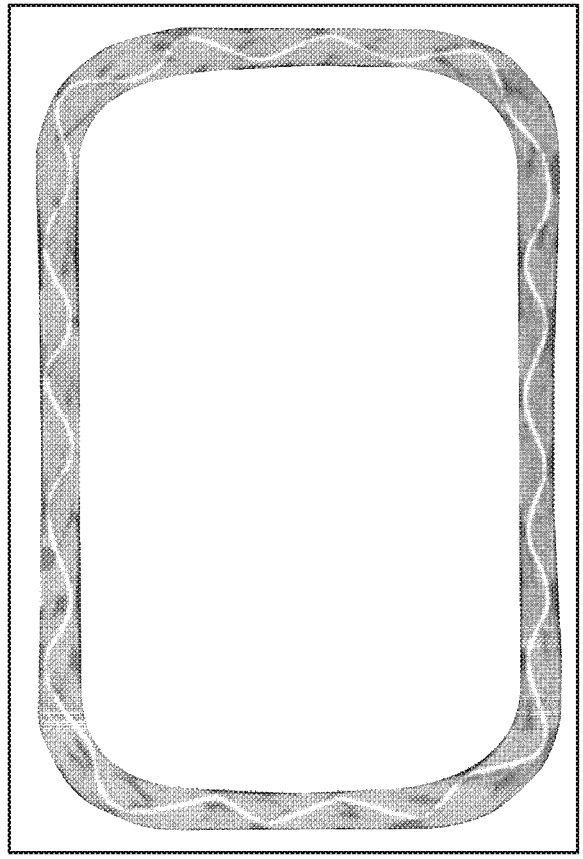
FIG. 13A3

US 11,471,736 B2

3D BRAIDING MATERIALS AND 3D BRAIDING METHODS FOR SPORTING IMPLEMENTS

CROSS REFERENCE TO RELATED APPLICATIONS

This application is a continuation-in-part of U.S. application Ser. No. 15/448,769, filed Mar. 3, 2017, which claims the benefit of U.S. Provisional Application No. 62/303,756, filed Mar. 4, 2016, which applications are incorporated herein by reference in their entirety.

FIELD

This disclosure relates generally to carbon fiber weaving materials and methods. More particularly, aspects of this disclosure relate to 3D weaving materials in sporting implements.

BACKGROUND

Sporting implements have transitioned from metal structures to glass or carbon fiber reinforced composite structures. Composite structures can be formed by stacking layers of different orientations or materials to achieve a desired thickness and then forming them into the requisite shape. With this design, the resulting part may lack strength or stiffness in the perpendicular direction or the z-direction in certain instances. Additionally, the formed parts can delaminate easily since they are only connected through a matrix in some instances. The inter-laminar weakness can, in certain instances, play a major role in the failure of the formed structures in select adaptations.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

In one aspect of the disclosure, a sporting implement can have an increased resistance to delamination. The sporting implement can be formed of a weave or braid constructed in three dimensions, which can have varying geometry in either the shape or in the fiber orientation of the weave.

Other objects and features of the disclosure will become apparent by reference to the following description and drawings.

BRIEF DESCRIPTION OF THE DRAWINGS

A more complete understanding of the present disclosure and certain advantages thereof may be acquired by referring to the following detailed description in consideration with the accompanying drawings, in which:

FIG. 11A illustrates a top-perspective view of a lower portion of an exemplary sporting implement utilizing a 3D braiding method;

FIG. 11B illustrates a top-perspective view of an upper portion of the exemplary sporting implement of FIG. 11A;

FIG. 12C shows a side-perspective view of a lower section of the exemplary sporting implement utilizing a 3D braiding method of FIG. 12A;

FIG. 12C shows a side-perspective view of a lower section of the exemplary sporting implement utilizing a 3D braiding method of FIG. 12A;

FIG. 12D shows a side-perspective view of an upper section of the exemplary sporting implement utilizing a 3D braiding method of FIG. 12A;

FIG. 13A1 shows a cross-sectional cut of the shaft at braiding plane A-A and is annotated to identify a specific tow.

FIG. 13A2 shows the top view of the cut cross-section of the shaft, at plane A-A, annotated to identify the orientation of the specific tow identified in FIG. 13A1.

FIG. 13A3 shows an exemplary path that the specific tow or fiber of FIGS. 13A-L can follow as the tow fiber is braided in the X direction.

Figure 1:
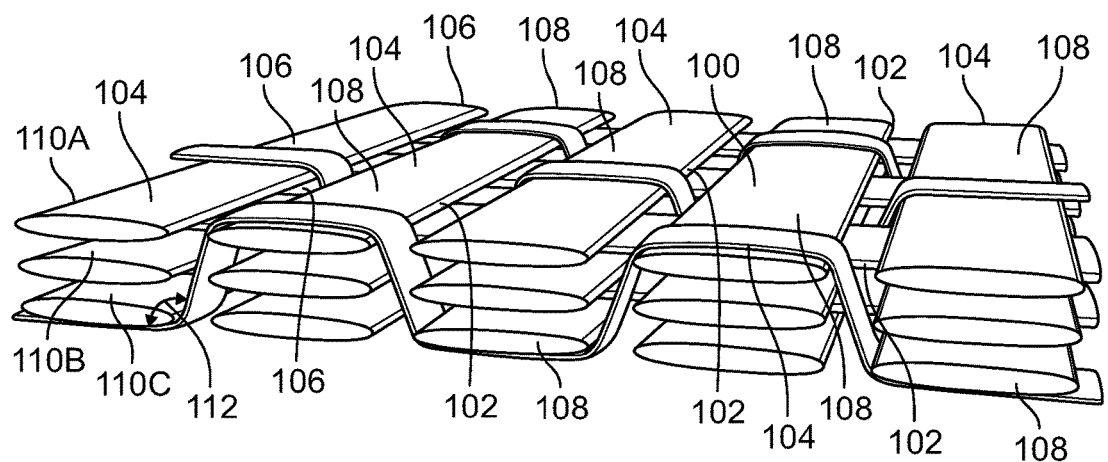
FIG. 1 illustrates an exemplary weaving pattern.

The reader is advised that the attached drawings are not necessarily drawn to scale.

DETAILED DESCRIPTION

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while the terms "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

In general, as discussed herein, aspects of this disclosure relate to methods for fabricating a 3D woven material and an exemplary 3D woven material for sporting implements. The exemplary weaves can be incorporated into any sporting implements, such as, baseball bats, lacrosse sticks, hockey sticks, rackets, helmets, and other protective equipment.

An example sporting implement can be constructed, partially or entirely, with a woven or braided three dimensional structure. The weave can be formed by a series of tows. A tow may include a collection or grouping of materials that extend together in a single direction and may include one or multiple fibers. Suitable fibers can include carbon, aramids, glass, basalt, or polypropylene. In certain examples, the tows can be formed of monofilaments, multiple filaments or combinations thereof, and the tows can have a variety of different cross sectional shapes, such as circular, ellipsoidal, triangular, or flat shaped in the form of tapes.

The 3D woven material can be a multi-directional layup having fibers oriented in three directions, warp (X), weft (Y) and the Z directions, and also at any angle created by a combination of two or three directions. In one example, a single woven preform can be formed that will have a near net shape of the formed product, with the fibers oriented in a way that will be optimal for the particular application. The structure can also be made to have minimal crimps in the warp direction (the longitudinal direction of the sporting implement) in desired areas by having fewer fibers in the Z directions, while having a high degree of fibers interlacing in different areas prone to delamination to provide strength to the sporting implement.

In one particular example, multiple fibers, such as a carbon, aramid, glass, or polypropylene fiber, can be grouped together and spread substantially flat to form thin elongated groups of fibers or fiber tapes. However, it is also contemplated that other numbers of fibers can be used to form the tapes depending on the desired strength and coverage of the fiber tapes. The tapes can be weaved in a three dimensional arrangement to form a woven material. The woven material can then be formed into the desired shape of the formed part or the sporting implement. Some types of fabrics, such as multilayer or angle interlock, could be fabricated with conventional weaving equipment for example, a shuttle loom. However, more complex woven structures, such as orthogonal or angled multilayer may necessitate machinery designed specifically for 3D structure such as a Jacquard type of weaving machine. The weave may be made using a pre-impregnated braid. Alternatively, the tapes can be formed dry and then during the molding process can be injected with resin. This process may be referred to as resin-transfer molding or infusion.

FIG. 1 shows an example weaving pattern of tows or tapes for forming a woven fabric 100. In this example, a plurality of first tapes 102, a plurality of second tapes 104, and a plurality of third tapes 106 can extend in each of the X, Y, and Z directions to form the woven fabric 100. In this example, the plurality of first tapes 102 can extend generally in the X direction, which can also be referred to as the warp direction. The plurality of second tapes 104 can extend generally in the Y direction, which can also be referred to as the weft direction. As is shown in FIG. 1, the plurality of first tapes 102 can extend generally orthogonal to the plurality of second tapes 104 to form rows or layers 110A, 110B, and 110C, and each row 110A, 110B, and 110C of the plurality of first tapes 102 or the plurality of second tapes 104 can form a single layer. It is also contemplated that the plurality of first tapes 102 and the plurality of second tapes 104 could be formed at other non-orthogonal angles or offset relative to one another. In the example shown in FIG. 1, three layers 110A, 110B, and 110C are shown. However, any number of layers can be included depending on the desired strength of the material.

The plurality of third tapes 106 can extend both in the Z direction and in the X direction. Portions of the third tapes 106 can also extend in the X direction parallel to the plurality of first tapes 102 adjacent to spacing formed between the plurality of first tapes 102. The portions of the third tapes 106 that extend in the X direction also form loops or crimps 108 around the plurality of the second tapes 104 on the top layer 110A and around the plurality of second tapes 104 on the bottom layer 110C. The third tapes 106, specifically the loops 108, help to maintain the layers formed by the plurality of first tapes 102 and the plurality of second tapes 104 together in the formed 3D weave. This helps to maintain the 3D woven material together during the formation of the part and also helps to increase resistance to crack propagation between layers or rows during operation or use of the formed part.

In this example, the plurality of third tapes 106 can extend in the X direction every three layers or rows 110A, 110B, 110C of the plurality of first tapes 102 and the plurality of second tapes 104. Also, as shown in this example, the plurality of third tapes 106 can extend at an angle 112 with respect to planes defined by each of the layers formed by the plurality of first tapes 102 and the plurality of second tapes 104. In this example, the angle 112 can be formed greater than 90°. For example, the angle can be formed in a range of 90° to 180° and, in one specific example, can be formed at 135°. In certain examples, the plurality of third tapes 106 can skip passing around a layer, and the angle 112 can be 180°. Other angles, including angles less than 90°, are contemplated depending on the desired strength and rigidity of the material.

Figure 2:
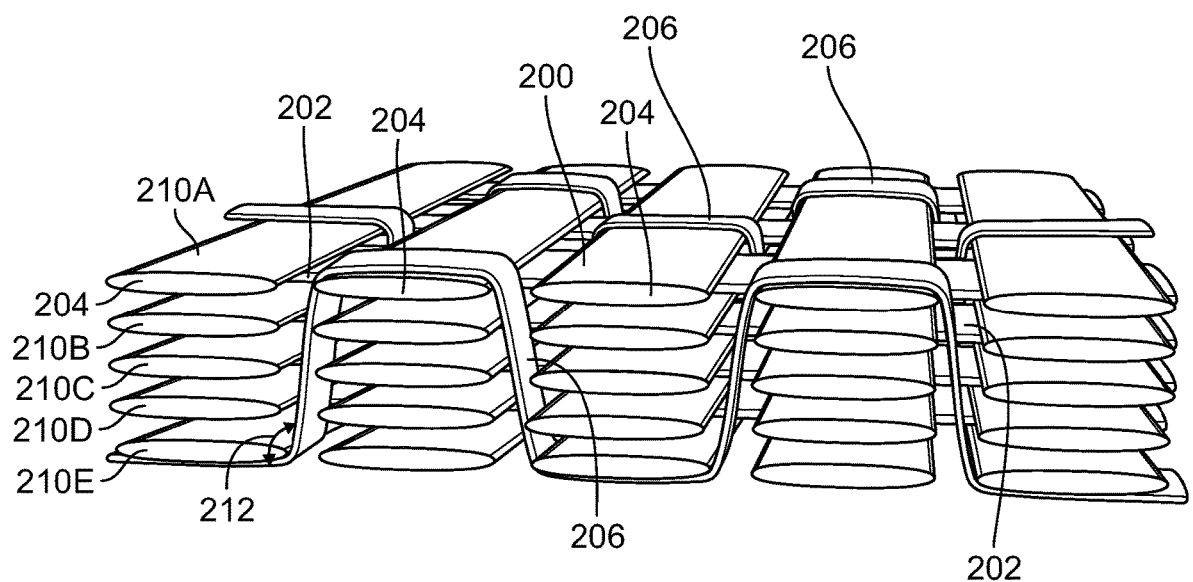
FIG. 2 illustrates a variation of the weaving pattern in FIG. 1.

FIG. 2 shows a variation of the weaving pattern of FIG. 1 for forming a woven fabric 200. This example is similar to the example discussed above in relation to FIG. 1, where similar reference numbers represent similar tows or tapes. However, in this example, the plurality of third tapes 206 can extend in the X direction every fifth layer of layers 210A, 210B, 210C, 210D, and 210E of the plurality of first tapes 202 and the plurality of second tapes 204. Additionally, the angle 212 formed between the plurality of tapes and the layers 210A, 210B, 210C, 210D, and 210E of the plurality of first tapes 202 and the plurality of second tapes 204 can be a smaller angle than that of the weaving pattern disclosed in relation to FIG. 1. This example also provides a thicker structure resulting in a stronger yet heavier structure for higher impacts. Additional layers can also be provided, for example, 3-12 layers may be provided, with the angle 212 ranging from 0° to 180°. Other numbers of layers are also contemplated.

Although in the examples shown in relation to FIGS. 1 and 2, the layers formed by the plurality of first tapes and the plurality of second tapes are formed parallel or at 90° in relation to each other, the layers can be oriented at different angles or can be formed non-parallel with an offset in relation to the longitudinal direction to provide more rigid or more flexible structures. For example, the layers can be oriented at a range of 5° to 90°, and in certain examples can be oriented at 5° to 75° and specifically at ±30°, ±45° or 90° in relation to the longitudinal direction of the sporting implement. Similar to the examples discussed above in relation to FIGS. 1 and 2, the layers can then be linked by tapes extending in the Z direction and weaved in a perpendicular or substantially perpendicular direction or other angles as discussed above in relation to the plane created by the layers in the case of orthogonal weaving.

Figure 3A:
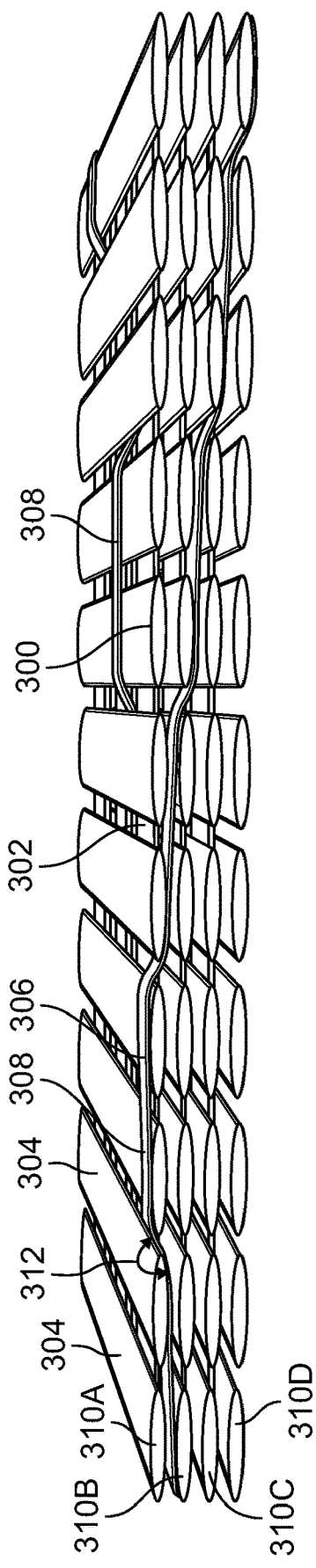
FIG. 3A illustrates a perspective view of another exemplary weaving pattern.
Figure 3B:
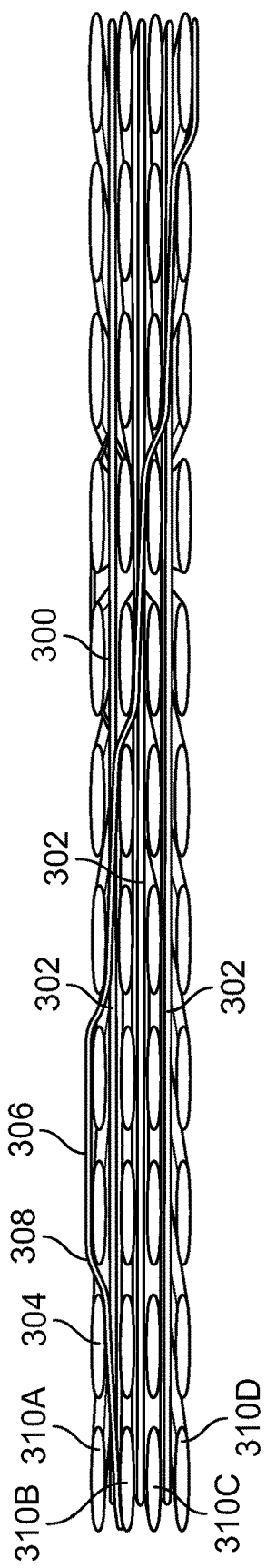
FIG. 3B illustrates a cross-sectional view of the exemplary weaving pattern of FIG. 3A.

FIGS. 3A and 3B show an alternative weaving pattern for forming a woven fabric 300. This example is similar to the example discussed above in relation to FIG. 1, where similar reference numbers represent similar tows or tapes. However, in this example, the plurality of third tapes 306 can extend in the X direction every layer of layers 310A, 310B, 310C, and 310D of the plurality of first tapes 302 and the plurality of second tapes 304 across selected pairs of the second tapes 304. Specifically, the plurality of third tapes 306 form loops or crimps 308, which wrap pairs of second tapes 304. Additionally, the angle 312 formed between the plurality of third tapes and the layers 310A, 310B, 310C, and 310D, of the plurality of first tapes 302 and the plurality of second tapes 304 can be a larger angle than that of the weaving pattern disclosed in relation to FIG. 1. In this example, in wrapping pairs of the second tapes 304, the plurality of third tapes can form a fewer amount of crimps or hoops 308 around the plurality of second tapes 304. The fewer number of crimps results in a stiffer formed structure.

Figure 4:
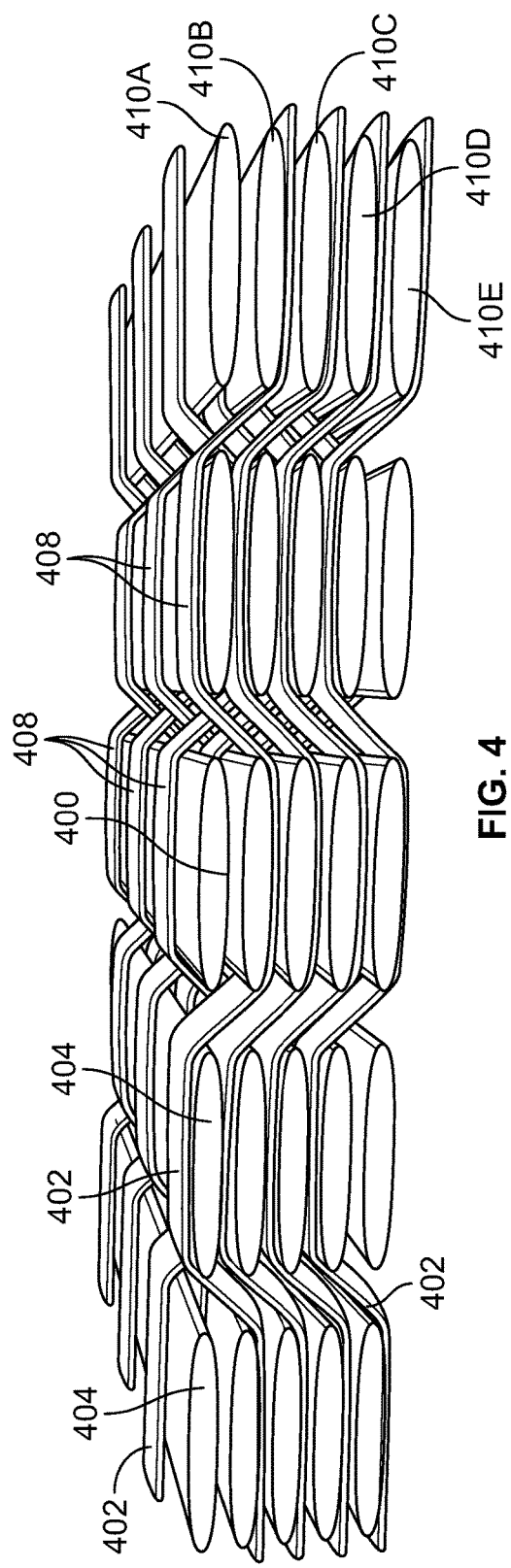
FIG. 4 illustrates a perspective view of another exemplary weaving pattern.

FIG. 4 shows another alternative weaving pattern for forming a woven fabric 400. This example is similar to the example discussed above in relation to FIG. 1 above, where similar reference numbers represent similar tows or tapes. However in this example, the warps 402 can extend both in the X direction and the Z direction thus eliminating the need altogether for the third plurality of tapes. Additionally, each warp 402 can extend orthogonally to its adjacent warp between the wefts 404. Other angles are also contemplated depending on the thickness of the wefts. Each weft 404 can include multiple crimps or hoops 408 formed by the warps 402. Moreover, the warps 402 can form an alternating sinusoidal-like pattern between adjacent layers the wefts 404.

Figure 5:
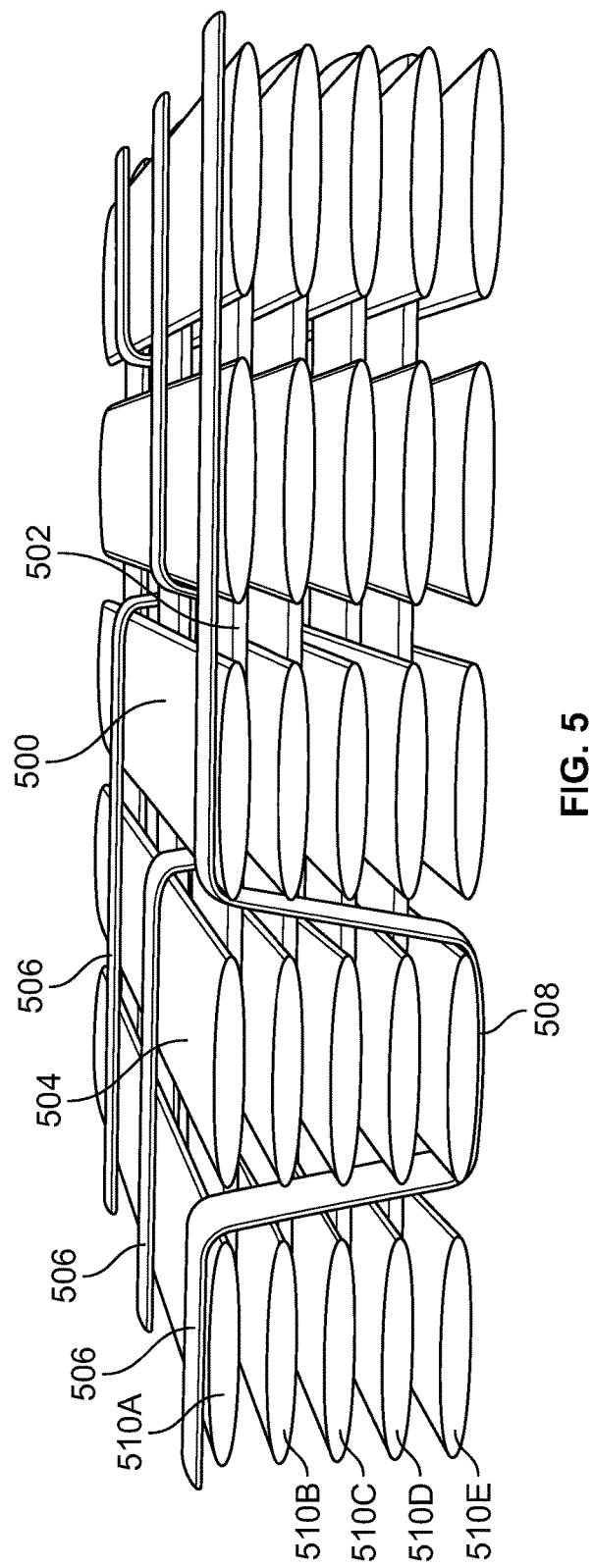
FIG. 5 illustrates a perspective view of another exemplary weaving pattern.

FIG. 5 shows another alternative weaving pattern for forming a woven fabric 500. This example is similar to the example discussed above in relation to FIG. 1, where similar reference numbers represent similar tows or tapes. In this example, the plurality of first tapes 502 and the plurality of second tapes 504 can be formed orthogonal to each other. However, in this example, fewer crimps or loops 508 can be formed by the plurality of third tapes 506. In this example, the crimps or loops 508 can be formed over each column of second tapes 504 alternatingly each row of layers 510A, 510B, 510C, and 510D in the X direction. In one example, the woven fabric could be used in an area where additionally rigidity is desired or in an area that may be subjected to fewer impacts.

Figure 6A:
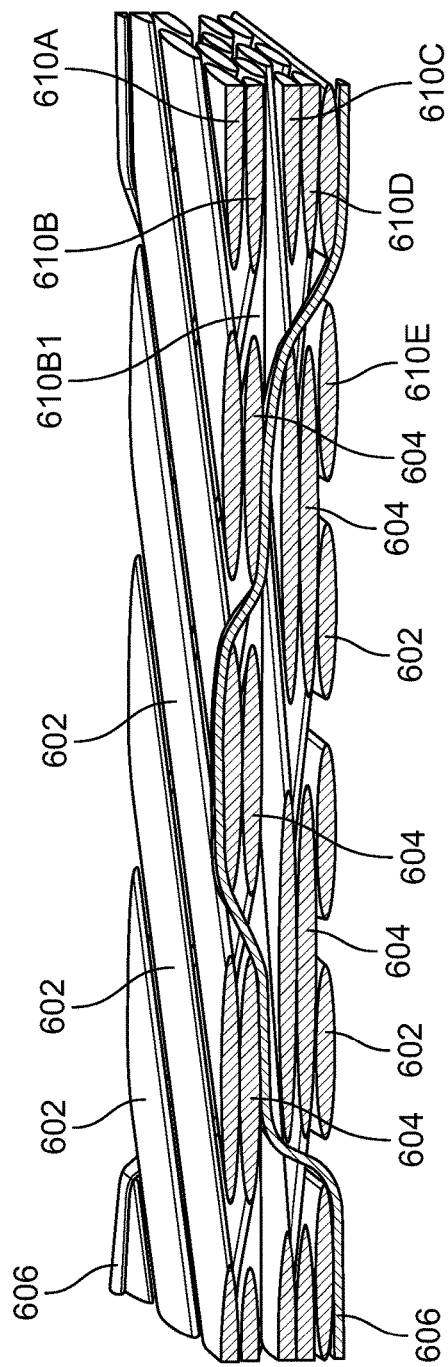
FIG. 6A illustrates a perspective view of another exemplary weaving pattern.
Figure 6B:
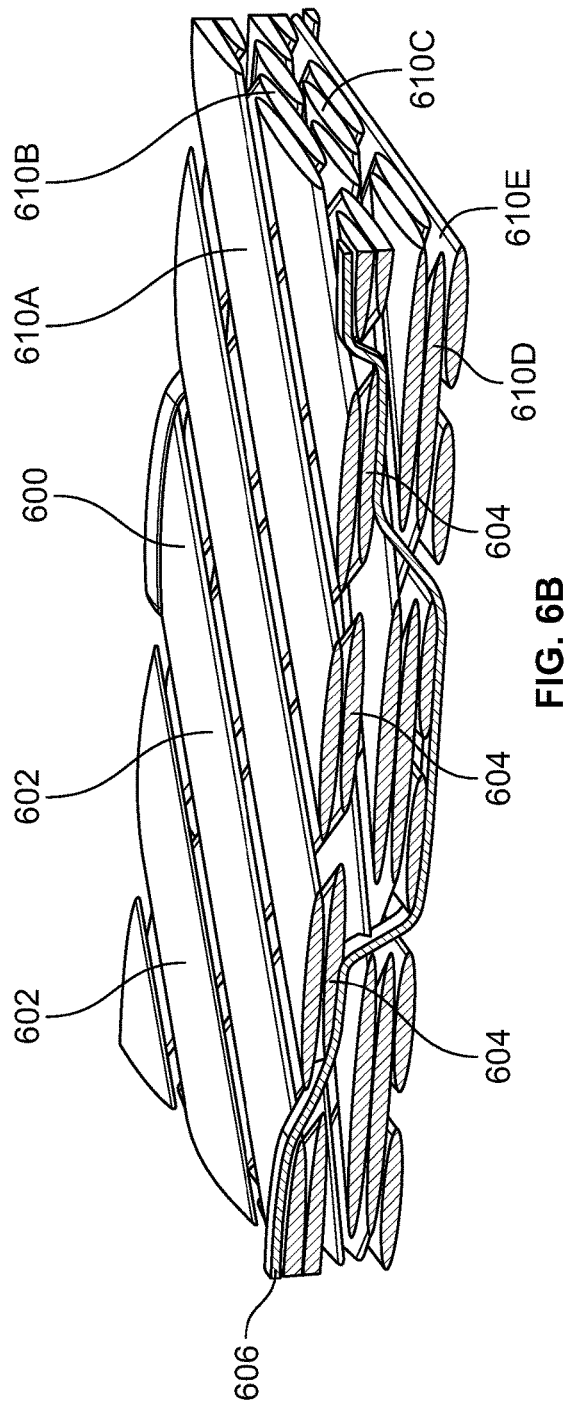
FIG. 6B illustrates another perspective view of the exemplary weaving pattern of FIG. 6A.
Figure 6C:
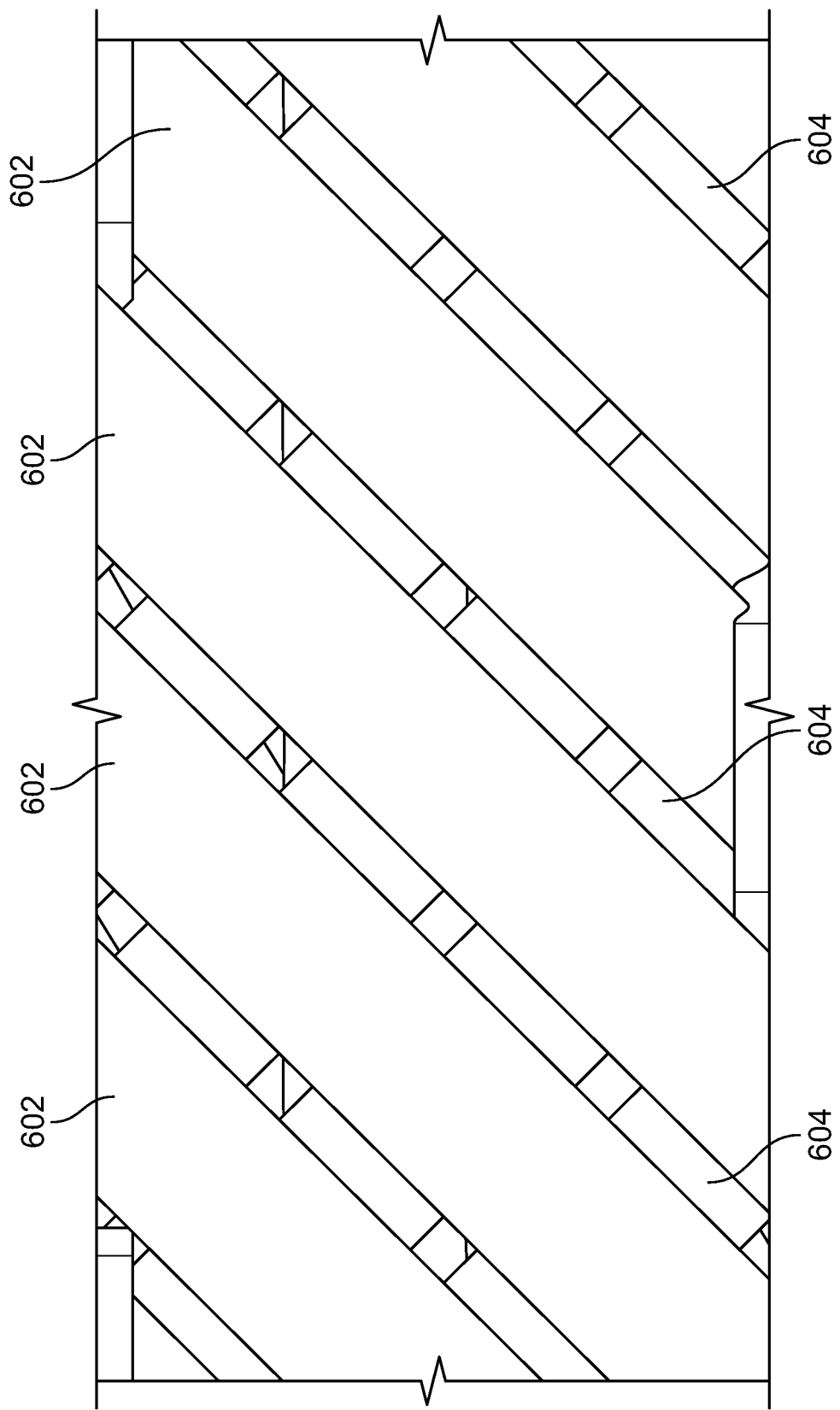
FIG. 6C illustrates a top view of the exemplary weaving pattern of FIG. 6A.

FIGS. 6A-6C show another alternative weaving pattern for forming a woven fabric 600. This example is similar to the example discussed above in relation to FIG. 1, where similar reference numbers represent similar tows or tapes. However, in this example, the plurality of first tapes 602 and the plurality of second tapes 604 can be weaved at ±45° angles relative to the X and Y axes and may also be weaved orthogonal to each other. Additionally, the plurality of first tapes 602 can form separate layers, e.g., 610A and 610C, and the plurality of second tapes 604 can from separate layers 610B and 610D. In addition, the plurality of first tapes 602 can change orientation every row or every few rows. In this example, row 610A can be at +45, 610B can be at −45°, row 610C can be at +30°, row 610D can be at −30°, and row 610E can be at 90° relative to the X axis. Also, another row 610B1 can be positioned between row 610B and row 610C and can be oriented at 0°.

For example, as shown in FIGS. 6A and 6B, the plurality of first tapes 602 can change orientation every fifth row. In this example, the plurality of first tapes 602 can be oriented at a 90° relative to the X-axis in layer 610D. It is also contemplated that the plurality of second tapes 604 can change orientation in a given layer and that the orientation angles can range from 0° to 180°. The plurality of third tapes 606 can extend through each of the layers 610A, 610B, 610C, 610D, and 610E of the plurality of first tapes 602 and the plurality of second tapes 604. The plurality of third tapes 606 can extend across a selected tape of the plurality of first tapes 602 or the plurality of second tapes 604.

The 3D woven materials discussed herein can, in one example, be applied to a high performance hockey stick. The number of waves, loops, or crimps affects the ultimate rigidity of the formed product. For example, fewer waves, loops, or crimps provide a stiffer hockey stick shaft whereas a higher number of waves, loops, or crimps provides a more flexible and durable hockey stick shaft. In this way, the hockey stick can be formed with different weaves having varying amounts of interlacing to control stiffness and durability of the hockey stick. In one example, the orientation of the fibers can vary along the length of the shaft to provide differing properties along the shaft of the hockey stick. In one example, the interlacing and crimps can be greater in areas where higher impacts occur such as the striking portion of the hockey stick shaft, and a lower number of interlacing and crimps can be included in areas of the shaft where the shaft of the stick should be more rigid such as the upper portions of the shaft where the player holds the shaft of the hockey stick.

Specifically, in the middle area of the hockey stick, the area below where the player positions his hand to take a shot or make a pass can have a higher number of tows or tapes oriented in the warp or X direction and fewer tapes or tows interlacing to create a stiff region. An area lower on the shaft that is prone to more impacts can have an increased number tows or tapes oriented in the weft direction or Y direction creating hoops and more interlacing to make that region stronger against delamination and impacts. For example, hoops are formed from wrapping the fibers in the perpendicular direction of the length of the weave when the weave is formed into the shape of a hockey stick shaft. These hoops provide stiffness when the weave is compressed.

Figure 7:
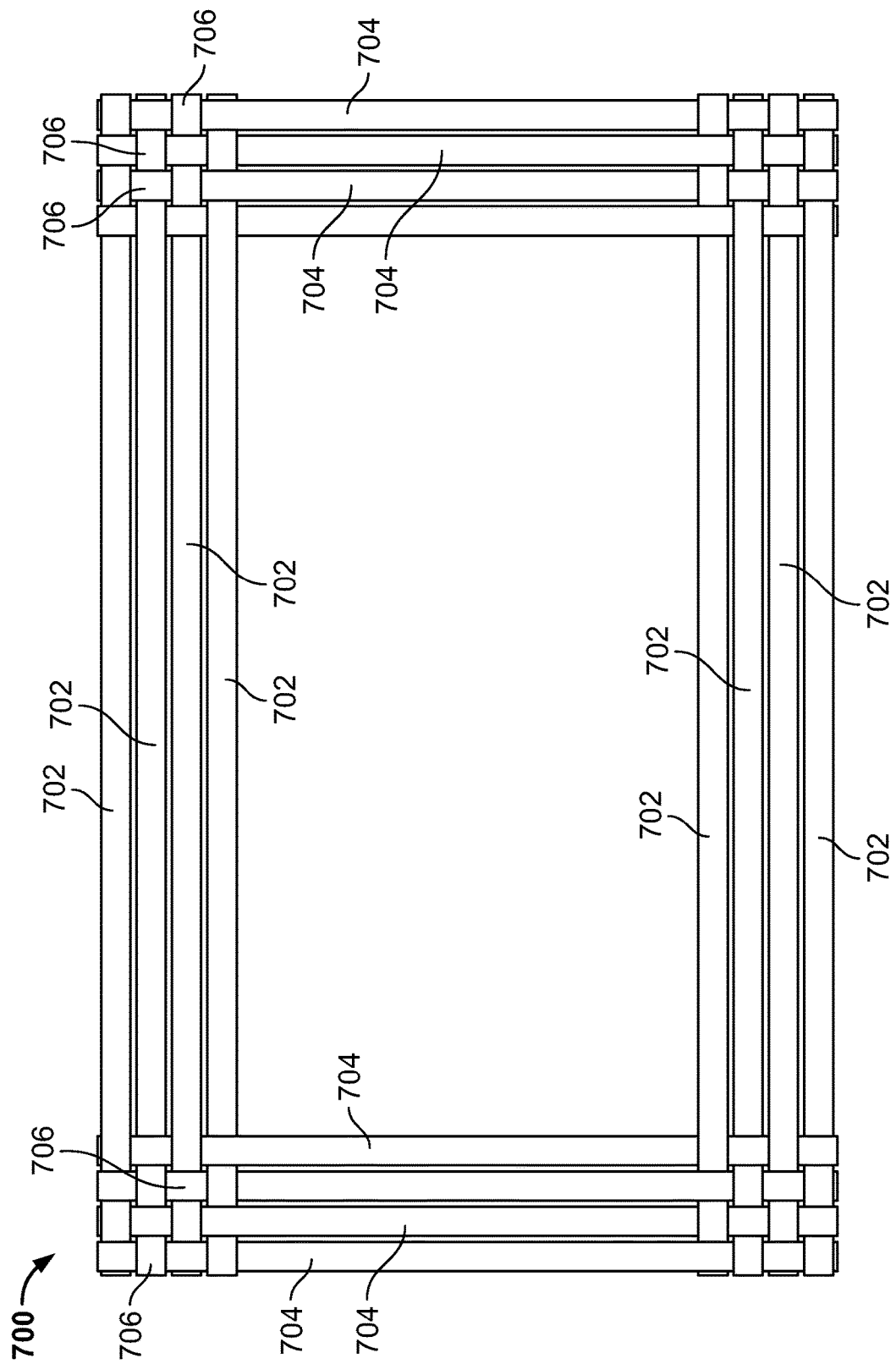
FIG. 7 illustrates another exemplary weaving pattern that can be applied to a sporting implement.

Another example of a 3D woven material 700 that could be utilized in sporting implement, such as a hockey stick is depicted in FIG. 7. Specifically, FIG. 7 shows a cross-sectional view of an example 3D woven material 700 as a weave for a hockey stick shaft. In this example, the weave 700 can be formed of two tape types, a plurality of first tapes 702 extending in the X direction, and a plurality of second tapes 704 extending in the Y direction.

Although the plurality of first tapes 702 and the plurality of second tapes 704 are shown generally orthogonal to each other, the plurality of first tapes 702 and the plurality of second tapes 704 can be oriented at different angles relative to each other. For example, the plurality of first tapes 702 and the plurality of second tapes 704 can be oriented from 0° to 90° relative to each other. Also the first tapes 702 and the second tapes 704 can be provided with varying fiber densities in order to provide the desired performance.

Additionally, each of the first tapes 702 and the second tapes 704 can extend in the Z-direction to provide a 3D woven fabric. For example, each of the first tapes 702 can extend at different angles relative to one another in the Z-direction. For example each of the first tapes 702 can alternate in extending at +45° relative to the z-axis and −45° relative to the z-axis. Therefore, at least two of the first plurality of tapes can be oriented at a first and second angle relative to the z-axis. The first angle of at least two of the first plurality of tapes can be greater than 20° from the z-axis and the second angle can be less than −20° from the z-axis.

Other angles relative to the Z-axis are also contemplated for example, ±5°, ±10°, ±15°, ±20°, ±25°, ±30°, ±35°, ±40°, ±45°, ±50°, ±55°, ±60°, ±65°, ±70°, ±80°, ±85° and can range from −90° to 90° from the Z-axis along with the combinations thereof. Likewise, each of the second tapes 704 can extend at different angles relative to one another in the Z direction. For example each of the second tapes 704 can alternate in extending at +45° relative to the z-axis and −45° relative to the z-axis. For example each of the second tapes 704 can alternate in extending at +45° relative to the z-axis and −45° relative to the z-axis. Therefore, at least two of the second plurality of tapes can be oriented at a first and second angle relative to the z-axis. The first angle of the at least two of the second plurality of tapes can be greater than 20° from the z-axis and the second angle can be less than −20° from the z-axis. Other angles relative to the Z-axis are also contemplated for example, ±5°, ±10°, ±15°, ±20°, ±25°, ±30°, ±35°, ±40°, ±45°, ±50°, ±55°, ±60°, ±65°, ±70°, ±80°, ±85° and can range from −90° to 90° from the Z-axis along with the combinations thereof.

The respective intersections of the plurality of first tapes 702 and the plurality of second tapes 704 can form crimps 706 to secure the plurality of first tapes and the plurality of second tapes 704. In this example, the crimps 706 are generally located in the four corners of the weave that also form the corners of the hockey stick shaft. The plurality of first tapes 702 form four intersections with the plurality of second tapes 704, and the crimps 706 help to secure the plurality of first tapes and the plurality of second tapes.

In this example, there can be no crimp or waviness in the fiber as the fiber is formed straight except in the areas where the warps 702 and wefts 704 meet. In the example of a hockey stick shaft, the corners can have a lot of interlacing (or interconnectivity), while the major and minor sides can have none. It can be desirable to apply this arrangement to a hockey stick, because most impacts occur in the corners of the shaft, and the corners of the shaft would be reinforced while not affecting much of the performance and rigidity of the stick.

Figure 8:
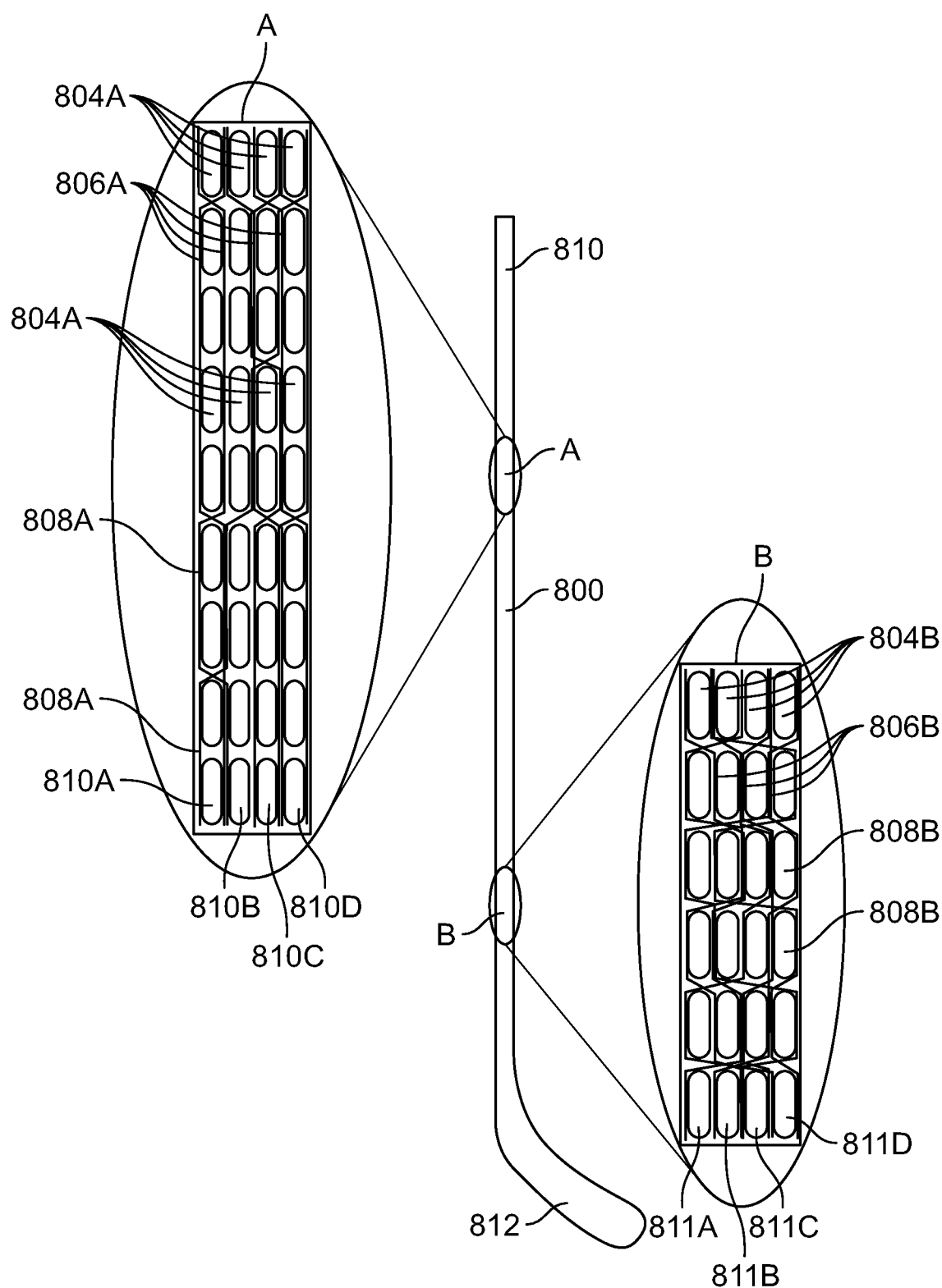
FIG. 8 illustrates another exemplary weaving pattern as applied to a sporting implement.

FIG. 8 shows an example schematic of a sporting implement, i.e., a hockey stick 800, which can utilize different weaves, for example the different weaves discussed herein, to provide for different rigidity along the shaft of the stick. Two portions A and B of the hockey stick shaft are shown magnified where both the areas A and B can be formed of different 3D weaves. As generally shown in FIG. 8, the area A toward the upper handle portion 810 of the shaft can be formed of a weave having a fewer number of fiber tapes extending in the Z direction than the area B near the blade 812 of the hockey stick. The example weave in portion A can provide a lower density weave having fewer interconnections than the weaving pattern shown in portion B.

Like in the above examples, the portion A weave can include a plurality of first tapes (not shown) extending in the X direction, a plurality of second tapes 804A extending in the Y direction, and a plurality of third tapes 806A extending in the Z direction. In this example, the plurality of first tapes and the plurality of second tapes 804A can form four rows or layers 810A, 810B, 810C, and 810D. However, other numbers of rows are also contemplated. In this example, the third tapes 806A can interconnect the layers in the Z direction every two to four second tapes 804A. In this example, although not shown, the plurality of second tapes 804A in the portion A weave can be greater than the plurality of first tapes. In one example, in the portion A weave, the ratio of the third plurality of tapes to the total number of the first plurality of tapes and of the second plurality of tapes is 0.5% to 10%. In another example, the ratio can be 5%.

However, as shown in the portion B weave, the third tapes 806B can interconnect the rows or layers 811A, 811B, 811C, and 811D in the Z direction every second tapes 804B. The higher number of interconnectivities in the portion B weave provides for a higher density structure than the portion A weave. Also, the portion A weave can be stiffer than the portion B weave by providing fewer crimps (or interconnectivities) between the rows 810A, 810B, 810C, and 810D in the portion A weave. Specifically, the portion A weave can include a first number of loops 808A that interconnect the first plurality of tapes extending in the X direction with the second plurality of tapes extending in the Y direction, and the portion B weave can include a second number of loops 808B interconnecting the first plurality of tapes extending in the X direction with the second plurality of tapes extending in the Y direction. In this example, the first number of loops 808A can be less than the second number of loops 808B. Again, a higher number of loops or crimps lowers the rigidity of the fibers and helps to prevent delamination. Also like the portion A weave, in one example, the ratio of the third plurality of tapes to the total number of the first plurality of tapes and of the second plurality of tapes is 0.5% to 10% in the portion B weave. In another example, the ratio can be 5%.

Also in this example, although not shown, the plurality of first tapes can be greater than the plurality of second tapes 804B in the portion B weave. In this example, the plurality of first tapes in the portion A weave is equal to the plurality of first tapes in the portion B weave, and the plurality of second tapes 804A in the portion A weave is equal to the plurality of second tapes 804B in the portion B weave. It is also contemplated that the hockey stick 800 can be provided with more than two weave types, for example, the hockey stick could be formed of 3, 4, 5, 6, etc. weave types depending on the desired stiffness and durability properties of the stick.

In other examples, it is contemplated that the 3D weave can remain constant throughout the length. In this case, the same 3D weave is used for the entire shaft. Providing the same 3D weave throughout the entire shaft can be easier to manufacture because it requires much simpler machinery, reduces the set-up time, and can create a lower cost formed part.

In other alternative examples, each layer, which can be formed by weaving fabrics in the X direction and in the Y direction can be stitched together through the thickness of each of the layers formed in the X and the Y direction. The stitching could be applied in the orthogonal direction to fabricate a stronger sporting implement in the Z direction.

In addition to the shaft of the stick, the 3D woven material can be used to form the blade of the hockey stick. In this example, the core can be a foam core. The 3D woven material forming the blade can connect the front face of the blade to the rear face of the blade to provide for additional structural rigidity in the blade itself. In other examples, however, the woven material may not connect the front face to the back face. This may be desirable in a process where traditional core materials (such as solid foams) would be used to create the pressure to compress the laminate in order to achieve the desired compaction or in cost sensitive applications where the operation can be simplified by only wrapping the woven material around the blade core. In this example, the 3D woven material could be formed into the shape of the blade, and a foam material or a core made of a synthetic material reinforced with layers of fibers could be inserted into the 3D woven material at one end of the blade.

The examples discussed herein help to reduce and potentially eliminate the possibility of fiber delamination, which helps to give the formed product a better resistance to impact, and can increase the overall performance of the formed product. Also the use of multilayer weaving for a sporting implement allows for a limitless design possibility, such as having particular zones that are more impact resistant, while others are designed to maximize stiffness, having multiple materials used in different areas with varying ratios.

In one example embodiment, a sporting implement may include a shaft having a first end and a second end. The first end may include a first 3D woven material, and the second end may include a second 3D woven material. The first 3D woven material can include a first layer and a second layer. The first layer and the second layer may include a first plurality of tapes extending in the X direction and a second plurality of tapes extending in the Y direction and a third plurality of tapes extending in the Z direction interconnecting the first layer and the second layer. The second 3D woven material may include a first layer and a second layer. The first layer and the second layer may include a first plurality of tapes extending in the X direction and a second plurality of tapes extending in the Y direction and a third plurality of tapes extending in the Z direction interconnecting the first layer and the second layer. The number of third tapes extending in the Z direction in the first 3D woven material can be less than the number of third tapes extending in the Z direction in the second 3D woven material.

The plurality of third tapes in the first 3D woven material and the plurality of third tapes in the second 3D woven material may also extend in the X direction. In the first 3D woven material the plurality of third tapes may extend at a first angle relative to the first layer and in the second 3D woven material the plurality of third tapes may extend at a second angle relative to the first layer. The first angle can be less than the second angle. The plurality of second tapes can be greater than the plurality of first tapes in the first woven material. The plurality of first tapes can be greater than the plurality of second tapes in the second woven material. The plurality of first tapes in the first woven material can be equal to the plurality of first tapes in the second woven material, and the plurality of second tapes in the first woven can be equal to the plurality of second tapes in the second woven material. The first layer and the second layer of the first woven material can be oriented at different angles relative to each other, and the first layer and the second layer of the first woven material can be oriented in the range of 5° to 75° in relation to a longitudinal direction. The first layer and the second layer of the second woven material can be oriented at different angles, and the first layer and the second layer of the second woven material can be oriented in the range of 5° to 75° in relation to a longitudinal direction.

The first 3D woven material may include a first number of loops interconnecting the first plurality of tapes extending in the X direction with the second plurality of tapes extending in the Y direction and the second 3D woven material may include a second number of loops interconnecting the first plurality of tapes extending in the X direction with the second plurality of tapes extending in the Y direction. The first number of loops can be less than the second number of loops.

In another example, referring now to FIGS. 9A-12B, a sporting implement may be formed by 3D braiding. By way of background, braiding and weaving involve different techniques. Braiding typically has a circular approach and results in the material forming a tube-like shape. Moreover, in braiding, the fibers are wound around a mandrel during manufacturing. On the other hand, weaving results in a linear/rectangular shape because the fibers are inserted around the mandrel in a linear motion. Moreover, in the 3D braiding described herein, "warp" is used to described the X or 0° yarn, and "braiding yarn" is used to describe the yarn extending at the ±angle. As such, the terms "braiding" or "braid" or "braiding yarn" or "braiding fiber" or "braiding tapes" and weft (Y) shall be used interchangeably herein. The material may include carbon fibers, which may be in the form of tows or tapes. The number of fibers in each tow or tape may range from 3,000 to 24,000 (3K to 24K) and can be either dry fibers or preimpregnated with a resin material, which also can be referred to as a pre-preg material. In one aspect, the tapes may be braided around a mandrel shaped to the dimension of the inside of the shaft of a sporting implement, such as a hockey stick, and subsequently molded to form the resulting shaft by inserting the preform into a mold and heating in the case of pre-preg fibers. In the case of dry fibers, the preform can be placed into a mold, heat can be applied (although not necessary), and resin can be injected in a resin transfer molding process.

Figure 9A:
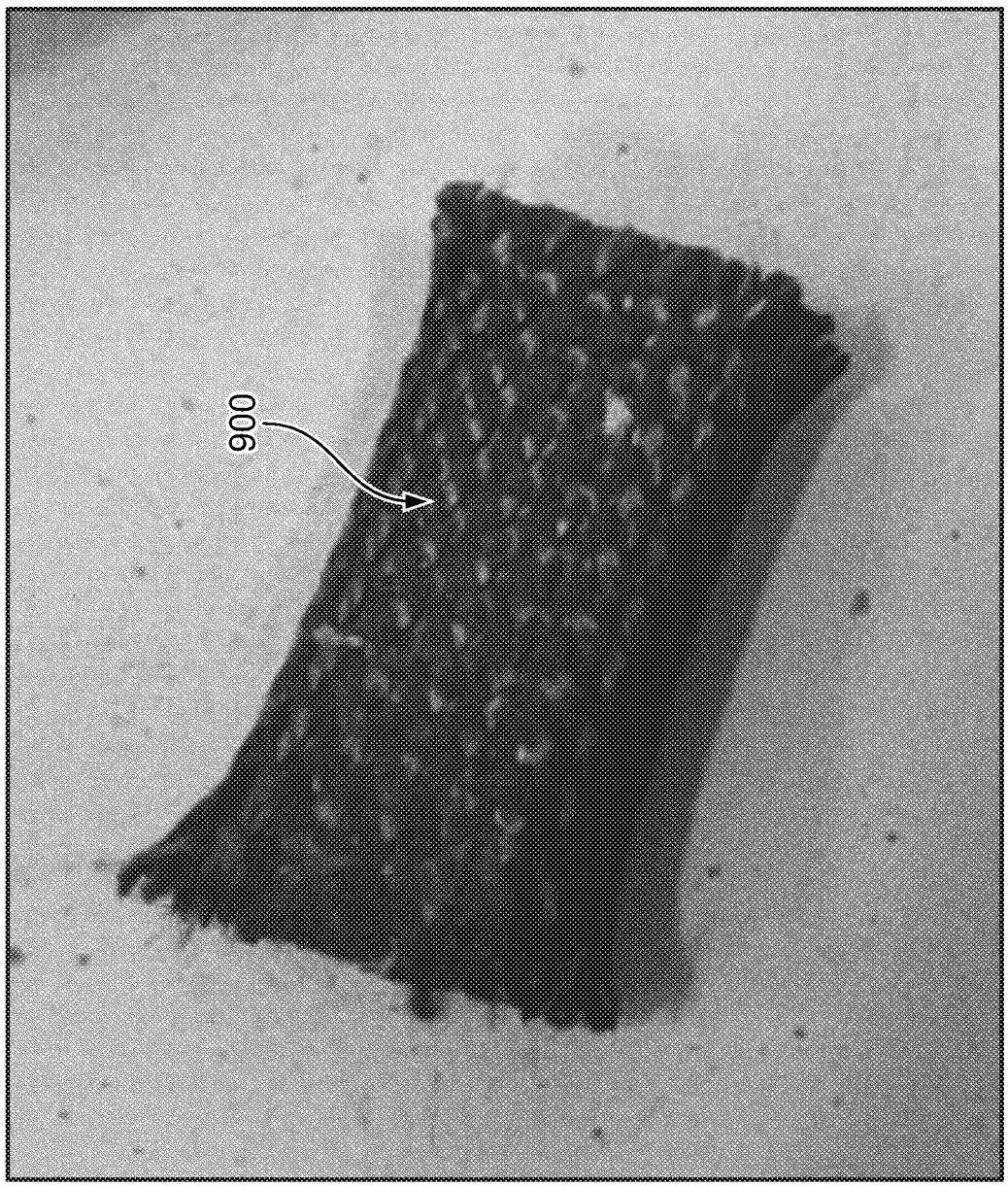
FIG. 9A illustrates a top-perspective view of an exemplary 3D braided section of a sporting implement.
Figure 9B:
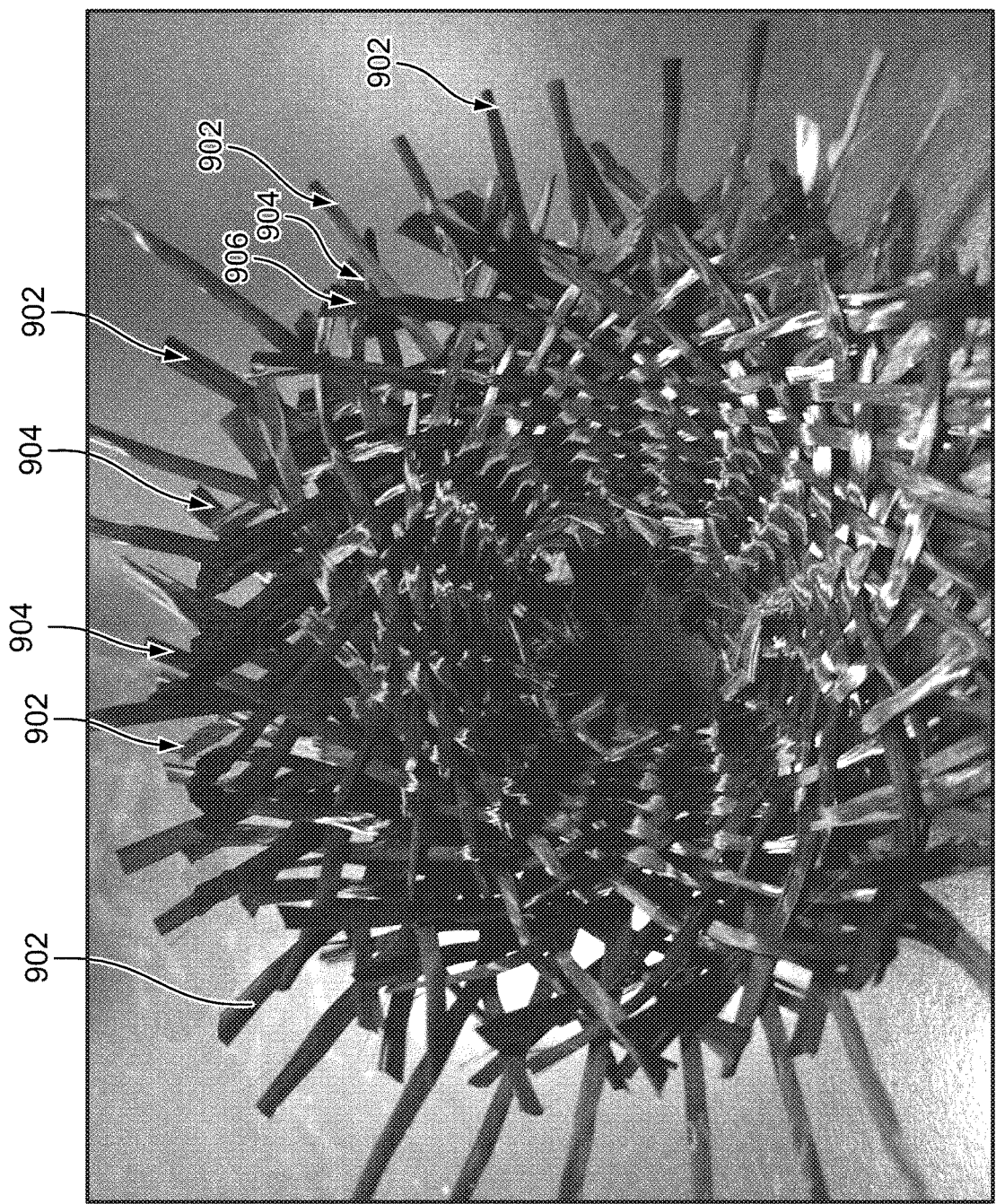
FIG. 9B illustrates a perspective cross-sectional view of the exemplary 3D braided section.

FIGS. 9A and 9B illustrate an example 3D braided section 900 of a sporting implement, such as a hockey stick shaft, where FIG. 9A shows a top-perspective view and FIG. 9B shows a perspective interior view. As is shown in FIGS. 9A and 9B, the fibers can extend in three directions, warp (X), weft (Y) and the Z directions. And in this example, fibers 902 can extend in the warp (X) direction, fibers 904, 906 can extend in all directions including the warp (X), the weft (Y) direction and the Z direction. Also the fibers 902 extending in the warp (X) direction of the 3D woven material may extend 0° in the X direction. In this example, the fibers extending in the warp (X), weft (Y) and Z directions can be positioned at a consistent ±angle. Also in this example, the fibers 904 can extend at a consistent ±angle relative to a longitudinal direction or the warp (X) direction throughout the thickness of the shaft. And in this example, the angles remain substantially the same throughout the length of the shaft.

Also in this example, the ±fibers or tapes may be woven from the inside to the outside and then back to the inside of the fibers or tapes extending in the X direction relative to the longitudinal axis. The angle of the warp (X) fibers, such as the fibers 902 would remain at an angle of about 0° while the fibers 904 and 906 extending in all directions may range from about ±19° to about ±60°, such as about ±30° to about ±50° in relation to a longitudinal direction. Also the thickness of the fibers used in the warp (X), weft (Y) and the Z directions may also remain constant. Because there is little to no thickness variation throughout the length of the braided material in the preform of the shaft, the Z tapes also maintain substantially the same angle throughout the length of the shaft.

Figure 10A:
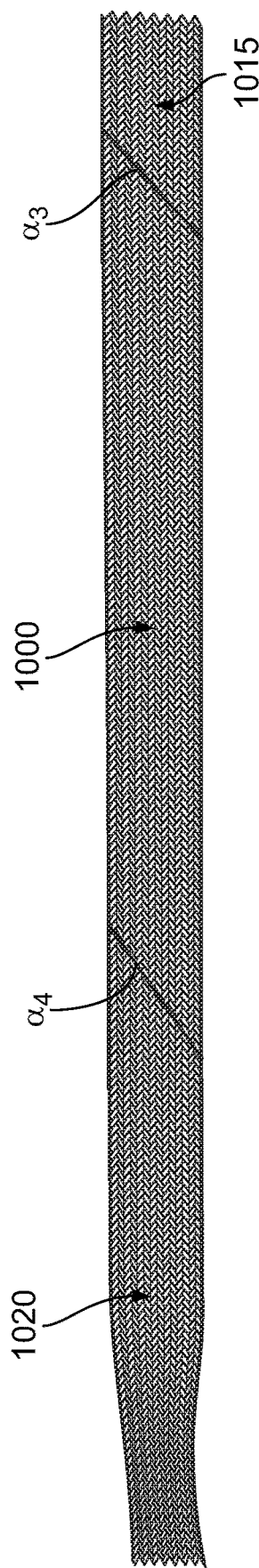
FIG. 10A illustrates a top-perspective view of a lower portion of an exemplary sporting implement utilizing a 3D braiding method.
Figure 10B:
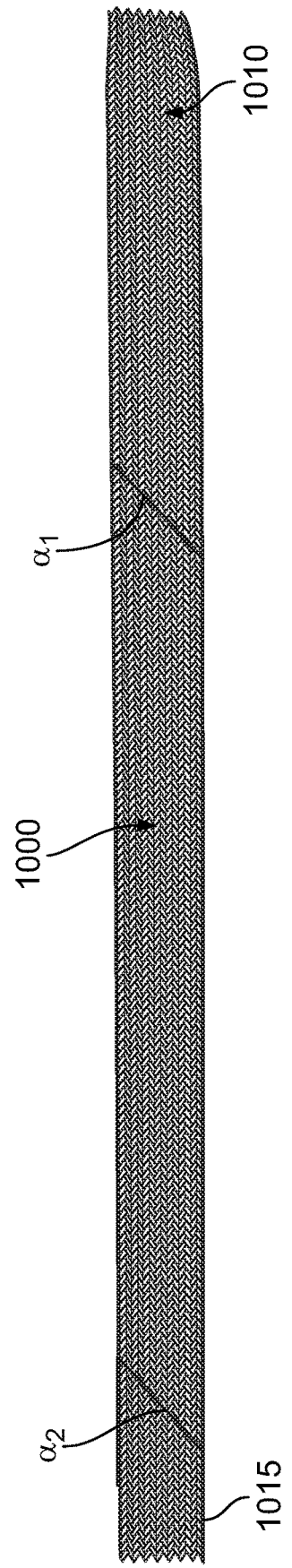
FIG. 10B illustrates a top-perspective view of an upper portion of the exemplary sporting implement utilizing a 3D braiding method of FIG. 10A.
Figure 10C:
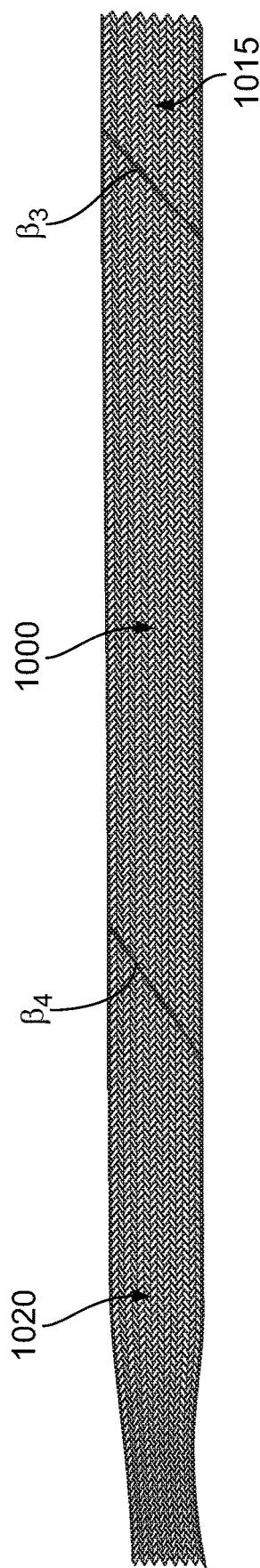
FIG. 10C shows a side-perspective view of a lower section of the exemplary sporting implement utilizing a 3D braiding method of FIG. 10A.
Figure 10D:
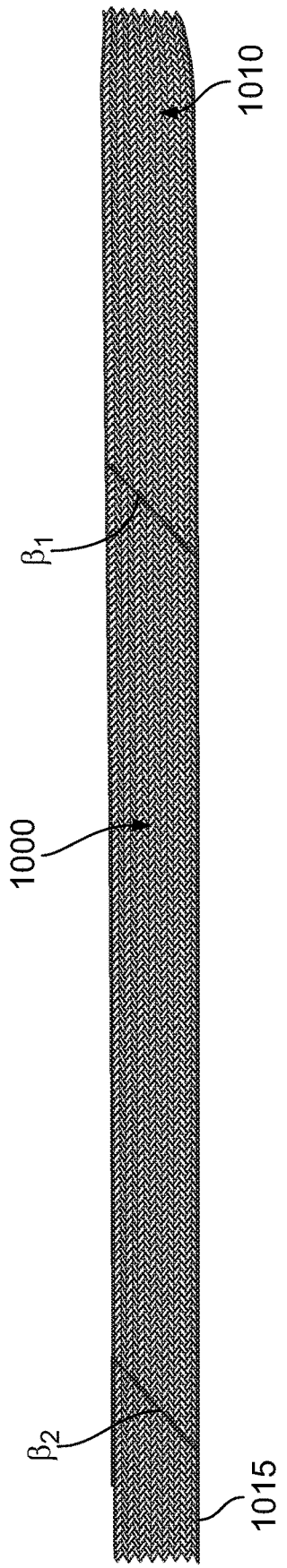
FIG. 10D shows a side-perspective view of an upper section of the exemplary sporting implement utilizing a 3D braiding method of FIG. 10A.

FIGS. 10A and 10B show a top-perspective view of a lower section of a sporting implement shaft 1000 and a top-perspective view of an upper section of a sporting implement shaft 1000 respectively formed by an example 3D braiding technique. FIGS. 10C and 10D show a side-perspective views of the lower section of the sporting implement shaft 1000 and a side-perspective view of an upper section of the sporting implement shaft 1000 respectively. The sporting implement shaft 1000 of FIGS. 10A-10D can be formed of a 3D braided material and can include a lower or proximal portion 1020, a middle portion 1015, and a distal portion 1010. In this example, a diameter or perimeter length of the shaft/mandrel dynamically changes along a length of the shaft from the distal portion 1010 to the middle portion 1015 and to the proximal portion 1020. The braid angles may be dependent on the geometry of the implement shaft 1000. Specifically, as the diameter decreases in the lower portion of the shaft 1000, the angles of the braiding fibers becomes smaller. As explained above, the fibers can be braided over a mandrel in the desired shape, and in this example, the angles of the braiding fibers and the warp fibers may change as the diameter of the mandrel changes. Yet the 3D braided material maintains substantially the same thickness from the distal portion to the middle portion and to the proximal portion.

The 3D braided material can have a plurality of warp fibers, a plurality of braiding fibers extending in the X, Y, and Z directions. In this example, the angles of braiding fibers and the warp fibers gradually decrease from the distal portion or handle end 1010 of the sporting implement shaft to the proximal portion 1020, which is near the blade (not shown), of the sporting implement shaft. Specifically, in this example, the plurality fibers extending in the X, Y, and Z directions may define first angles ($\alpha_{1-4}$) relative to the plurality of warp fibers, and the plurality of braiding fibers extending in the X, Y, and Z direction may define second angles ($\beta_{1-4}$) relative to the plurality of warp fibers. In particular, the plurality of braiding fibers extending in the X, Y, and Z directions may define first angles ($\alpha_{1-4}$) relative to the plurality of warp fibers in a XY plane and the same plurality of braiding fibers extending in the X, Y, and Z directions may define second angles ($\beta_{1-4}$) in a XZ plane relative to the plurality of warp fibers. With respect to this aspect, the first angles ($\alpha_{1-4}$) will remain constant, for example ±45°, however, the second angles ($\beta_{1-4}$) will not be constant since the fiber travels up and down through the thickness of the braided material. And in one example, the second angles ($\beta_{1-4}$) in the XZ plane relative to the plurality of warp fibers may vary according to a sine wave variation. The first angle ($\alpha_1$) and the second angle ($\beta_1$) are both larger at the distal portion 1010 of the shaft than at the middle portion 1015 of the shaft. And the first angle ($\alpha_{2-3}$) and the second angles ($\beta_{2-3}$) at the middle portion 1015 may be greater than the first angle ($\alpha_4$) and the second angle ($\beta_4$) at the proximal portion 1020 of the shaft. Also, the first angles ($\alpha_{1-4}$) and the second angles ($\beta_{1-4}$) vary with the perimeter length of the shaft dynamically changing along the length of the shaft from the distal portion 1010 to the middle portion 1015 and to the proximal portion 1020. In one example, the first and second angles ($\alpha_1$, $\beta_1$) of the braiding fibers and the warp fibers can start out at about 30 to 50 degrees, such as about ±43.5 degrees adjacent the distal portion, the first and second angles ($\alpha_{2-3}$, $\beta_{2-3}$) can be between about 30 to 50 degrees, such as about ±42 degrees at a middle portion 1015 of the shaft of the sporting implement, and the first and second angles ($\alpha_4$, $\beta_4$) can be about 30 to 50 degrees, such as about ±35 degrees adjacent to the proximal portion 1020 of the shaft of the sporting implement near the blade.

When the 3D braid of this example is applied to a sporting implement such as a hockey stick shaft, as the dimension of the shaft of the sporting implement changes, the angle of the braid varies to accommodate for the change in dimension to maintain a uniform thickness. For example, the warp (X) fibers remain the same orientation throughout the shaft, but the braiding fibers, which can extend in each of the X, Y, and Z directions will change orientation as the dimension of the shaft of the sporting implement changes. The first angle in the X/Y/Z plane of the braiding yarns is the angle most affected by the change in dimension, as these braiding fibers are being pulled during manufacturing, a reduction in mandrel diameter will reduce the first angle as the braiding fibers tend to align towards a longitudinal axis. There will be a negligible reduction in thickness of the 3D braid resulting in the second angles (in the Z direction) changing (although on a much smaller scale than the first angle). As a result, the thickness of the braided material remains substantially constant throughout the length of the shaft. The 3D braided material will have generally the same thickness throughout the length of the shaft, as the angle of the braiding fibers or tapes adjust relative to the longitudinal direction to accommodate for the varying geometry. In one example, if the braid is made on a mandrel of a constant shape and diameter, and it is desired to conform the braid to a smaller diameter shape, the braid will elongate which will reduce the angle of the braid but also slightly reduce the fiber density/thickness of the braid. Again, the variation in thickness of the braid is much smaller than the variation in angle the weft direction. As the perimeter decreases, the braid's relative angle will become smaller. In one example, in the case of a hockey stick shaft, the measured angles ($\alpha_{1-4}$, $\beta_{1-4}$) may be ±43.5 degrees at the top proximal end (larger perimeter) of the shaft, but may decrease to ±35 degrees at the bottom distal end of the shaft (smaller perimeter) in the order of about 19.5%. Yet in other examples the decrease in angle may be in the order of 5% to 35%. Again, a negligible reduction in thickness may also occur as the braid's relative angle decreases in the order of about 20% (from about 45° to about 35°), but may be in the order of 5% to 35%. The geometry of the stick also varies as the shaft transitions to the proximal end or hosel section of the blade. In one example, the perimeter measurements between the largest end at the distal end of the shaft and the smallest end at the end of the taper at the proximal end of the shaft near the bottom can decrease or vary by about 13%, and in one example, may decrease or vary between 5% and 35%. Also, the thickness of the 3D braided material remains relatively constant, but the angle of the braiding fibers or tapes changes to account for the varying geometry of the stick, as illustrated in FIGS. 10A and 10B.

Figures 11C, 11D:
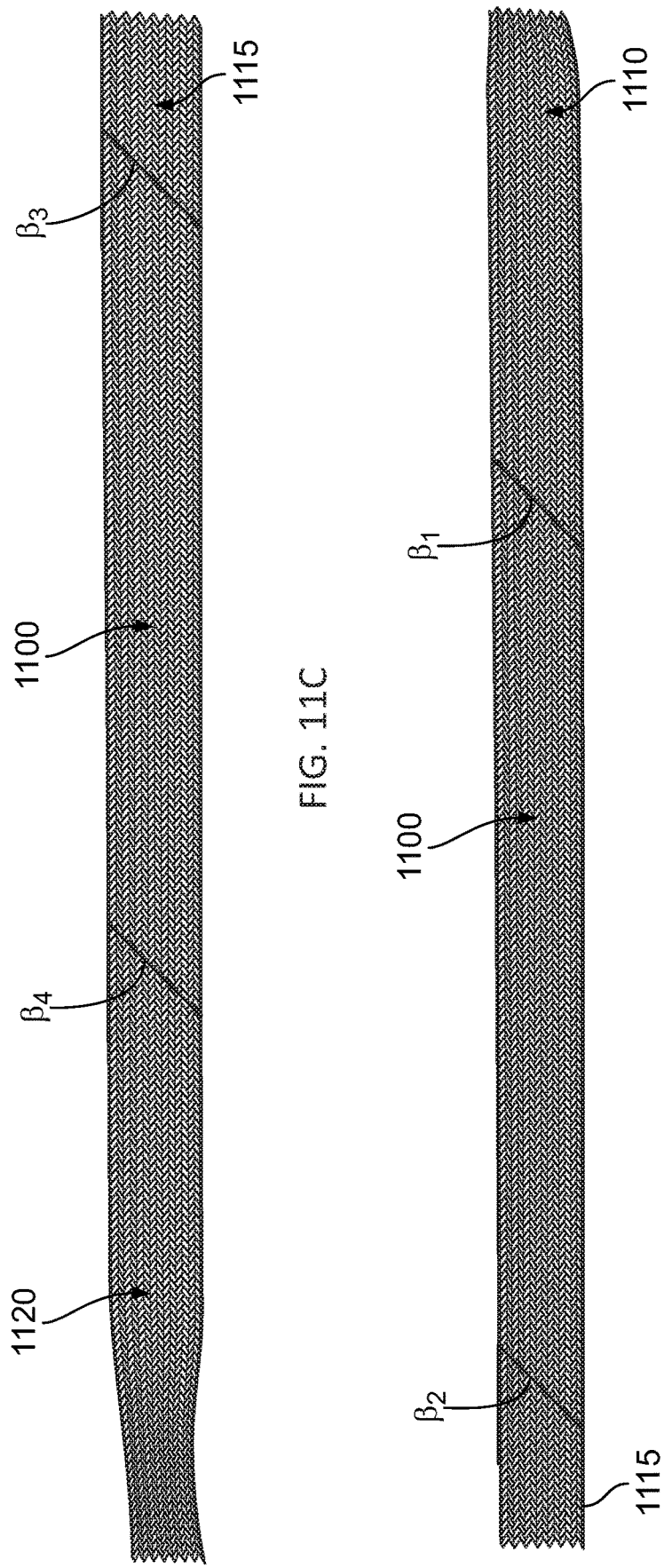
FIG. 11C shows a side-perspective view of a lower section of the exemplary sporting implement utilizing a 3D braiding method of FIG. 11A.
FIG. 11D shows a side-perspective view of an upper section of the exemplary sporting implement utilizing a 3D braiding method of FIG. 11A.

FIGS. 11A and 11B show a top-perspective view of a lower section of a sporting implement and a top-perspective view of an upper section of a sporting implement shaft respectively formed by a 3D braiding technique. FIGS. 11C and 11D show a side-perspective view of the lower section of the sporting implement and a side-perspective view of the upper section of the sporting implement shaft respectively. The sporting implement shaft 1100 of FIGS. 11A-11D may be formed of a 3D braided material and can include a lower or proximal portion 1120, a middle portion 1115, and a distal portion 1110, where the proximal portion 1120 is located near a blade. In this example, a diameter or perimeter length of the shaft/mandrel dynamically changes along a length of the shaft from the distal portion 1110 to the middle portion 1115 and to the proximal portion 1120.

As explained above, the fibers can be braided over a mandrel (not shown) in the desired shape. And in this example, the angles ($\alpha_{1-4}$, $\beta_{1-4}$) of the braiding fibers may stay the same or substantially the same as the diameter of the mandrel changes. In this example, the angles ($\alpha_{1-4}$, $\beta_{1-4}$) of braiding fibers remain constant from the distal portion or handle end 1110 of the sporting implement shaft to the proximal portion 1120, which is near the blade (not shown), of the sporting implement shaft. The 3D braided material may have a plurality of warp fibers and a plurality of braiding fibers. The plurality of braiding fibers can define first angles ($\alpha_{1-4}$) relative to the plurality of warp fibers and the same plurality of braiding fibers can define second angles ($\beta_{1-4}$) relative to the plurality of warp fibers. Similar to the above and in particular, the plurality of braiding fibers extending in the X, Y, and Z directions may define first angles ($\alpha_{1-4}$) relative to the plurality of warp fibers in a XY plane and the same plurality of braiding fibers extending in the X, Y, and Z directions may define second angles ($\beta_{1-4}$) in a XZ plane relative to the plurality of warp fibers. The first angles ($\alpha_{1-4}$) and second angles ($\beta_{1-4}$) remain substantially constant along the shaft from the distal portion to the middle portion and to the proximal portion despite the perimeter length of the shaft dynamically changing along the length of the shaft from the distal portion to the middle portion and to the proximal portion. Yet the 3D braided material maintains the same thickness from the distal portion 1110 to the middle portion 1115 and to the proximal portion 1120. This is so, because the braiding speed is adjusted to the varying geometry providing a constant angle even with the varying geometry, and the thickness remains the same throughout the shaft. During manufacture, the braiding speed (the bobbins turning around the mandrel) and the mandrel speed (linear speed at which the braid is being deposited on the mandrel) of the braiding equipment is adjusted to maintain a constant angle and thickness of the braided material. In one example, the first and second angles ($\alpha_1$, $\beta_1$) of the braiding fibers warp fibers can be at around ±45 degrees adjacent the distal portion 1110, the first and second angles ($\alpha_{2-3}$, $\beta_{2-3}$) can be around ±45 degrees at a middle portion 1115 of the shaft of the sporting implement, and ±45 degrees adjacent to the proximal portion 1120 of the shaft of the sporting implement 1100 near the blade.

Figure 12A:
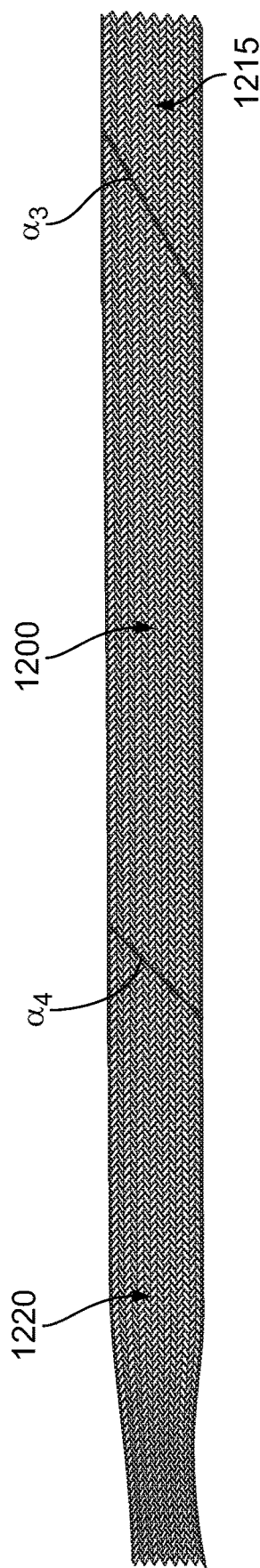
FIG. 12A illustrates a top-perspective view of a lower portion of another exemplary sporting implement utilizing a 3D braiding method.
Figure 12B:
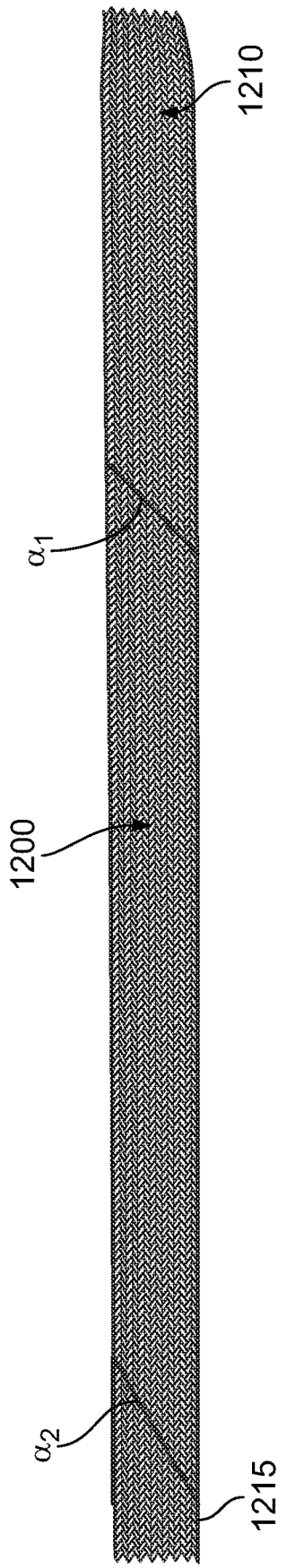
FIG. 12B illustrates a top-perspective view of an upper portion of the exemplary sporting implement of FIG. 12A.

FIGS. 12A and 12B show a top-perspective view of a lower section of a sporting implement and a top-perspective view of an upper section of a sporting implement shaft respectively formed by a 3D braiding technique. FIGS. 12C and 12D show a side-perspective view of the lower section of the sporting implement and a side-perspective view of the upper section of the sporting implement shaft respectively. The sporting implement shaft 1200 of FIGS. 12A and 12B can include a lower or proximal portion 1220, a middle portion 1215, and a distal portion 1210, again where the proximal portion 1220 is located near a blade. In this example, a diameter or perimeter length of the shaft/mandrel dynamically changes along a length of the shaft from the distal portion 1210 to the middle portion 1215 and to the proximal portion 1220.

As explained above, the fibers can be braided over a mandrel in the desired shape, and like the examples above, the 3D braid may include a plurality of fibers extending in the warp or X direction only and a plurality of braiding fibers extending in the X, Y, and Z directions. The plurality of braiding fibers extending in the X, Y, and Z directions can define first angles ($\alpha_{1-4}$) relative to the plurality of warp fibers, and the same plurality of braiding fibers can define second angles ($\beta_{1-4}$) relative to the plurality of warp fibers. Specifically, and similar to the above, the plurality of braiding fibers extending in the X, Y, and Z directions may define first angles ($\alpha_{1-4}$) relative to the plurality of warp fibers in a XY plane and the same plurality of braiding fibers extending in the X, Y, and Z directions may define second angles ($\beta_{1-4}$) in a XZ plane relative to the plurality of warp fibers. Also in this example, the angles of the braided fibers and the warp fibers may change independently of the geometry of the mandrel. In this example, the angles of the braided fibers and the warp fibers are the same at the distal portion or handle end 1210 of the sporting implement shaft and at the proximal portion 1220, which is near the blade (not shown), of the sporting implement shaft 1200. Yet in the middle portion 1215, the angles ($\alpha_{1-4}$, $\beta_{1-4}$) of the braided fibers and the warp fibers decrease as compared to the proximal portion 1220 and the distal portion 1210 of the sporting implement shaft 1200.

Again in this example, the 3D braided material may have a plurality of warp fibers and a plurality of braided fibers. The first angles ($\alpha_{1-4}$) and the second angles ($\beta_{1-4}$) are both larger at the distal portion 1210 of the shaft 1200 than at the middle portion 1215 of the shaft, and the first angle ($\alpha_1$) and the second angle ($\beta_1$) at the distal portion are approximately equal to the first angle ($\alpha_4$) and the second angle ($\beta_4$) at the proximal portion of the shaft despite the perimeter length of the shaft dynamically changing along the length of the shaft from the distal portion to the middle portion and to the proximal portion. In one example, the first and second angles ($\alpha_{1-4}$, $\beta_{1-4}$) of the braided fibers and the warp fibers can be at around ±45 degrees adjacent the distal portion, can be around ±30 degrees at a middle portion 1215 of the shaft of the sporting implement, and ±45 degrees adjacent to the proximal portion 1220 of the shaft of the sporting implement near the blade.

As discussed above in relation to the examples of FIGS. 9A-12B, the plurality of braiding fibers extending in the X, Y, and Z directions can define a first angle relative to the plurality of warp fibers, and the same plurality of braiding fibers can define a second angle relative to the plurality of warp fibers. FIGS. 13A-L illustrate a position of a particular fiber on an example braid. Specifically, the position of a particular fiber in the 3D braid is illustrated by dots as shown in FIGS. 13A-13L. For example, as is illustrated in FIGS. 13A-13D, the fiber is moving in a −45° direction relative to the warp direction. In FIGS. 13C-13D, the fiber is also moving deeper into the braid in the XZ plane. In FIG. 13H the yarn begins to move back up in the XZ relative to the thickness of the braid plane and in FIG. 13J moves down in the same angle. In particular, the plurality of braiding fibers extending in the X, Y, and Z directions may define a first angle relative to the plurality of warp fibers in a XY plane and the same plurality of braiding fibers extending in the X, Y, and Z directions may define a second angle in a XZ plane relative to the plurality of warp fibers. In one example, the variation of the first angle to the second angle can be periodic and may approximate a sine wave. The sine wave is approximated schematically in FIG. 13A3. In particular, the example fiber of FIGS. 13A-13L can approximately follow the path shown in FIG. 13A3 as the fiber is braided in the X direction.

It is also contemplated that the braiding configurations of FIGS. 13A-L could be applied to blades (discussed in more detail herein), where the plurality of braiding fibers extending in the X, Y, and Z directions may define a first angle relative to the plurality of warp fibers in a XY plane and the same plurality of braiding fibers extending in the X, Y, and Z directions may define a second angle in a XZ plane relative to the plurality of warp fibers.

Figure 13A:
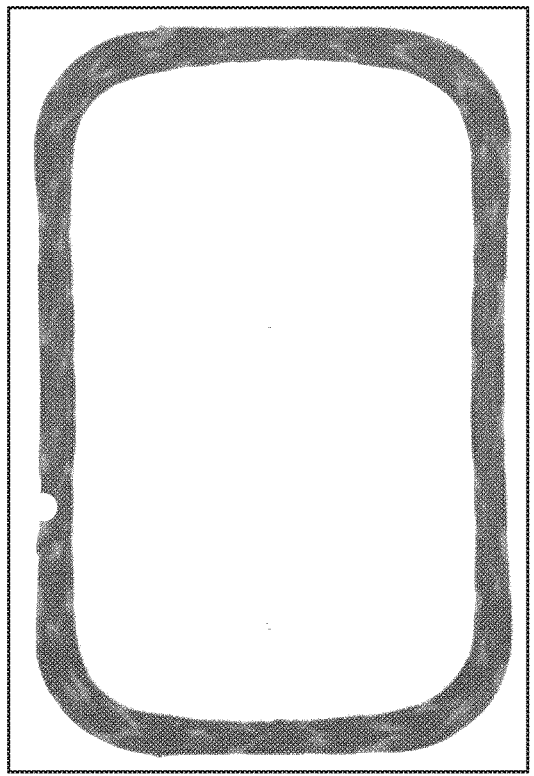
FIGS. 13A-13L illustrate a top perspective view of an exemplary 3D braided section, depicting a position in the XY plane and corresponding image of the position in the YZ plane of a specific tow as it is braided around the shaft of an exemplary sporting implement.
Figure 13B:
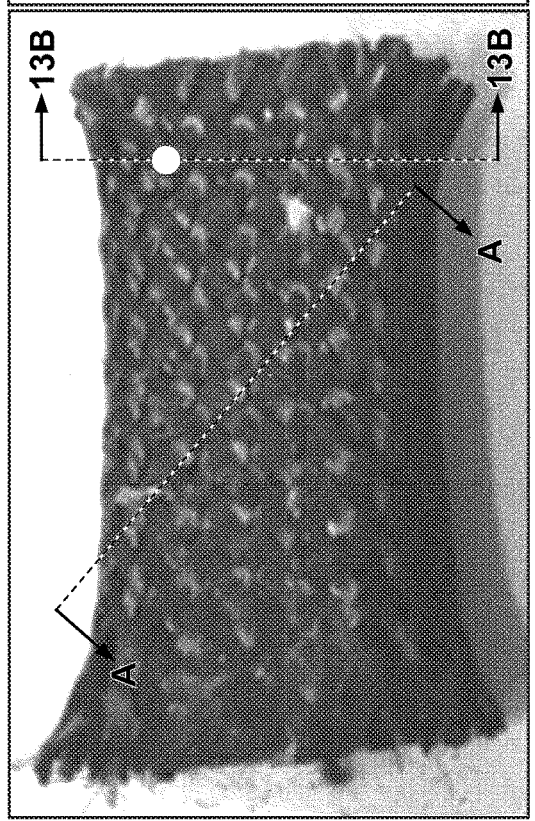
Figure 13C:
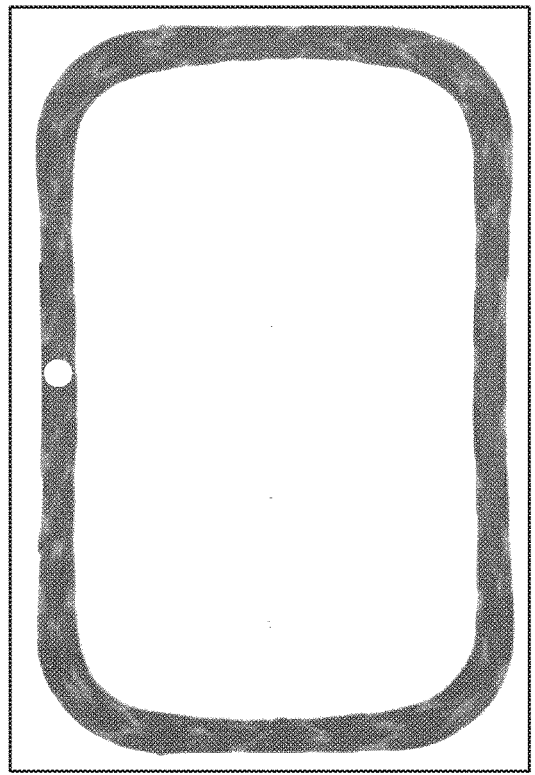
Figure 13D:
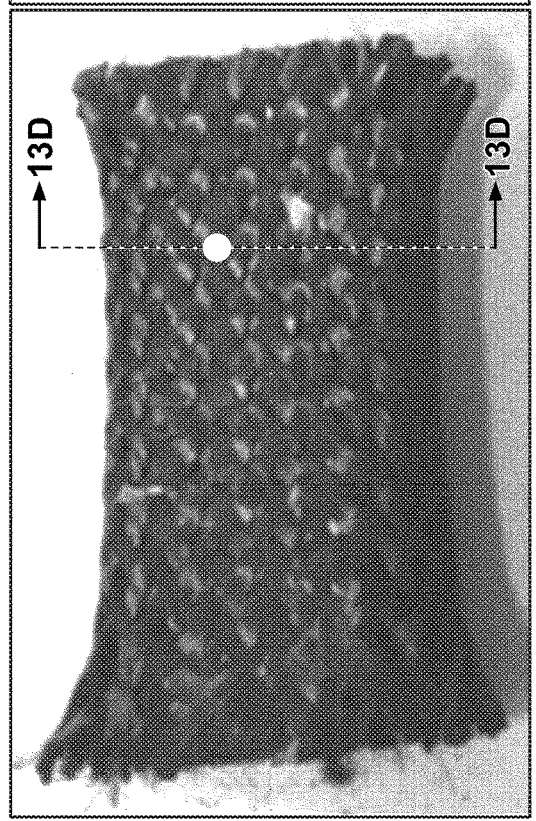
Figure 13E:
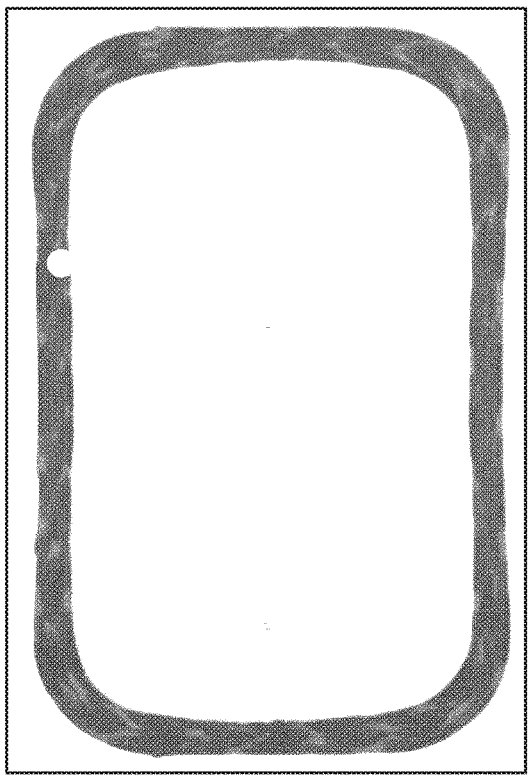
Figure 13G:
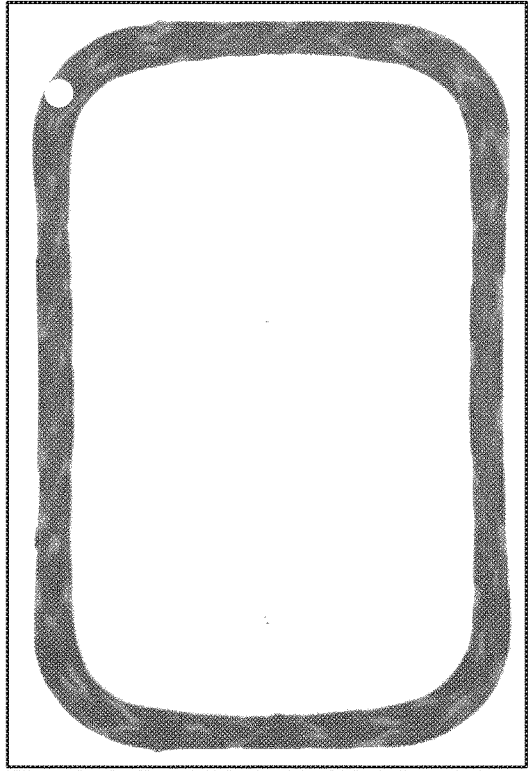
Figure 13F:
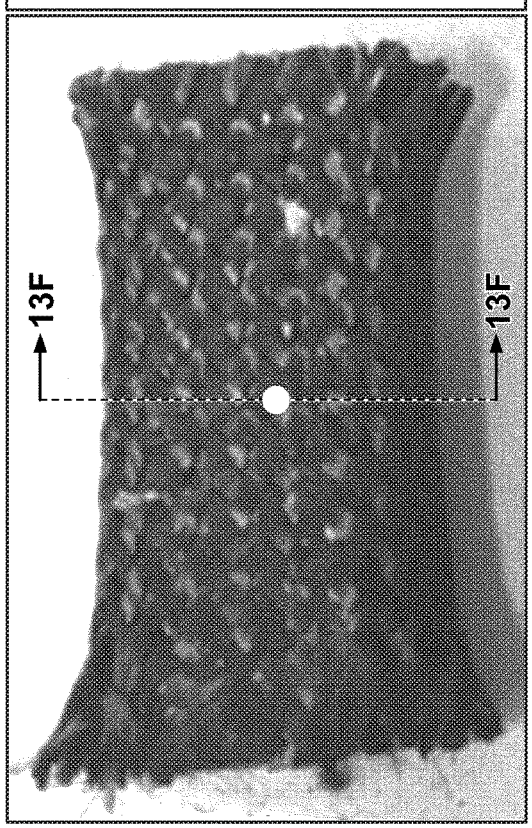
Figure 13H:
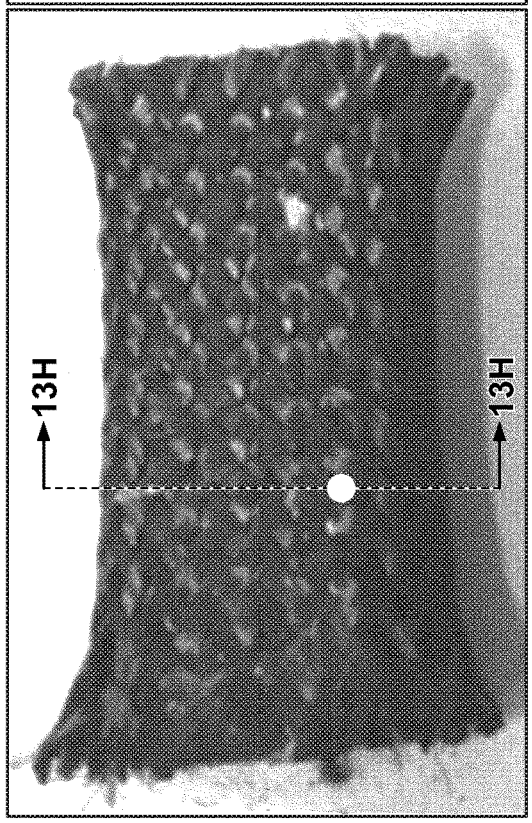
Figure 13I:
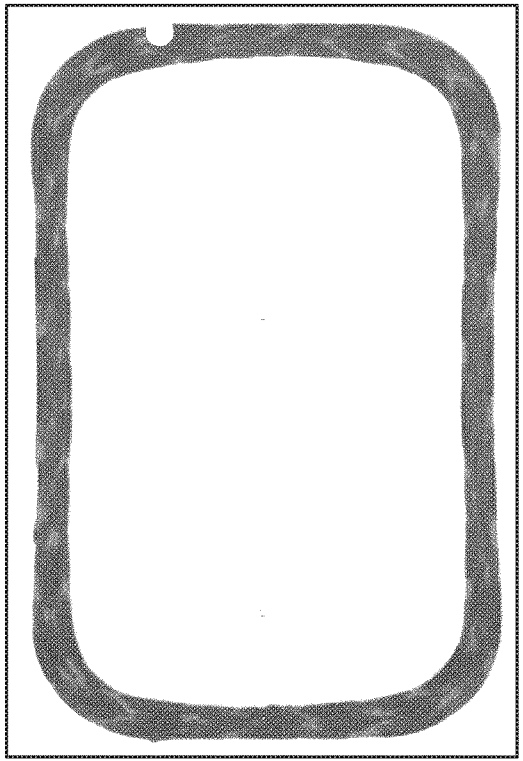
Figure 13J:
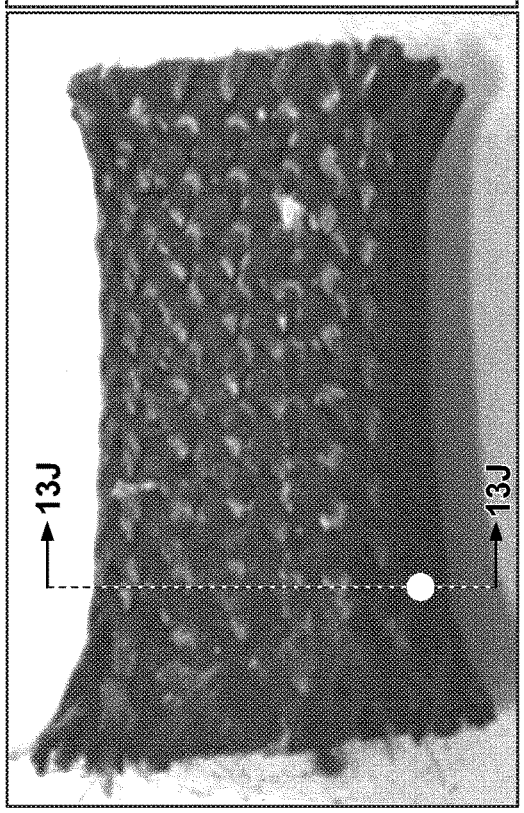
Figure 13K:
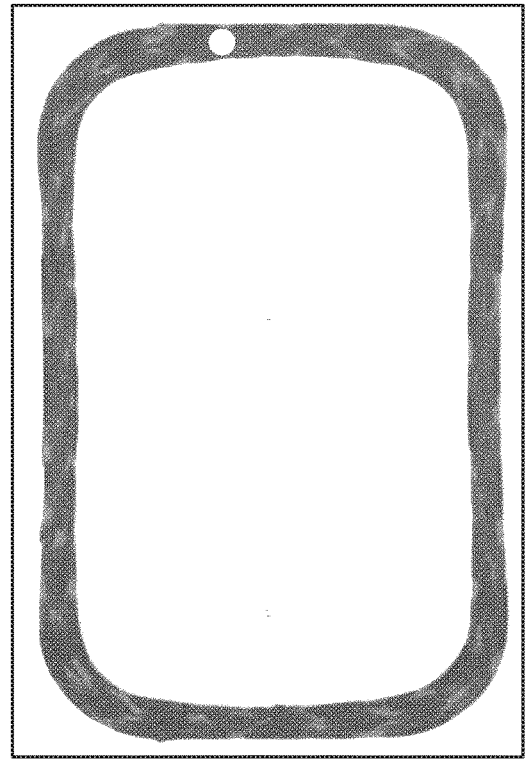
Figure 13L:
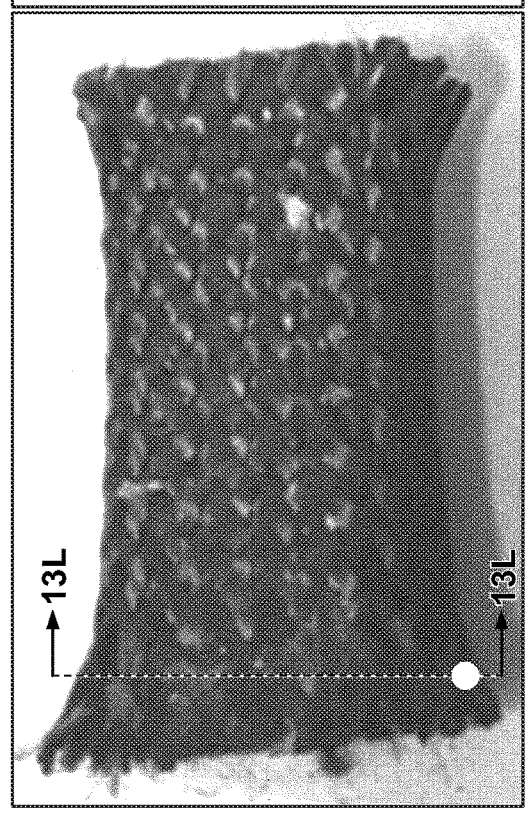

Additionally, FIG. 13A is annotated to illustrate plane A-A of a braided section of the shaft. FIG. 13A1 shows a cross-sectional cut of the shaft at braiding plane A-A and is annotated to identify a specific tow of the 3D braiding. FIG. 13A2 shows the top view of the cut cross-section of the shaft, at line A-A, annotated to identify the orientation of the same specific tow identified in FIG. 13A1. As is shown in FIGS. 13A1 and 13A2, the specific tow extends at an angle in the XY plane in this example. This is similar to the above examples and further illustrates that the fibers of the 3D braid can define a first angle relative to the warp fibers in an XY plane.

It is contemplated that the example 3D weave and 3D braid methods can be shaped to a multi-dimensional sporting implement. One such example is a hockey stick, including a hockey stick shaft having varying geometry as discussed herein. And the hockey stick may have multiple sides, even numbered sides and odd numbered sides, including, without limitation, for example, three sides, four sides, five sides, six sides or seven sides.

Figure 14B:
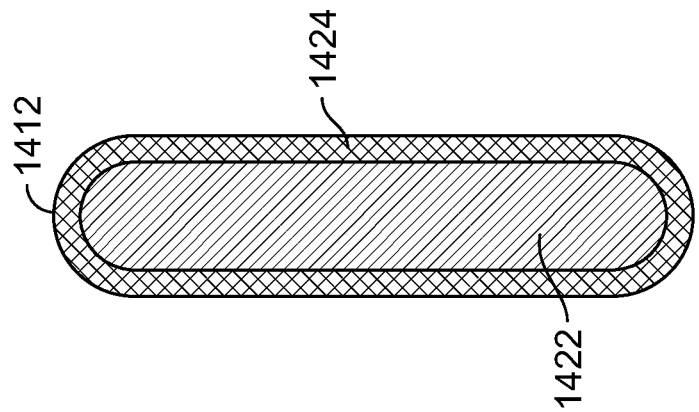
FIG. 14B shows a cross-sectional view of the example core of FIG. 14A.
Figure 14A:
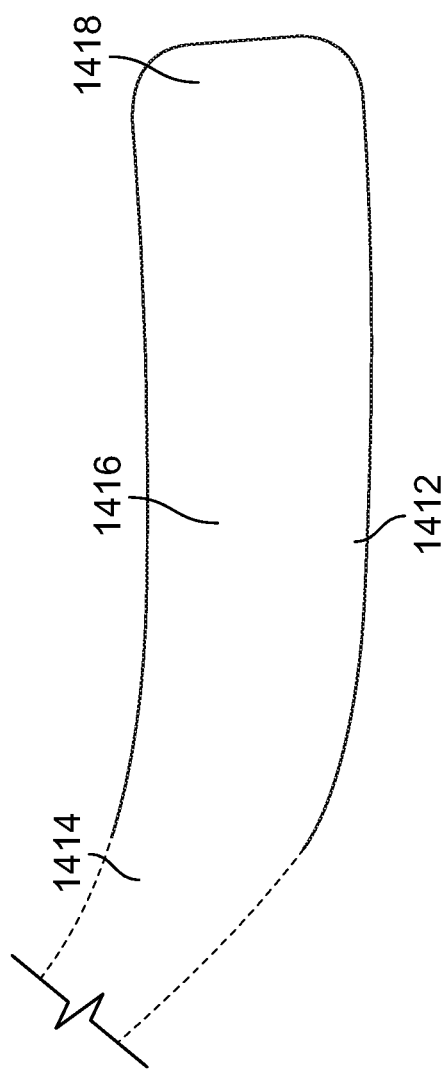
FIG. 14A shows a front perspective view of an example core.

In another aspect, a 3D braided material can be shaped to the dimension of a blade of a sporting implement, such as a hockey stick. Similar to the 3D braided material applied to a mandrel in the shape of a shaft of a hockey stick, the 3D woven material may be applied to a mandrel or a core in the shape of a blade of the hockey stick. For example, as shown in FIGS. 14A and 14B, an example blade 1412 can include a heel portion 1414, a middle portion 1418, a toe portion, and a core portion 1422 where the outer layer 1424 is formed of a 3D material. In one example, the mandrel can be removed and one or more bladders may be used to form the core during molding. In such case, a core structure may be omitted from the blade entirely to create a different "feel" of the stick to the player.

In one example the core can be a foam core. And the core can include multiple cores of different densities. For example, the foam can be placed on various locations of the blade to create a blade with zones of varying density, such as the top or the toe of the blade to reduce weight. In other examples, the core can be formed of one or more of syntactic or non-syntactic foams and can include one or more of EVA, polyurethane, PVC, PMI, epoxies having expandable thermoplastic microspheres, and one or more elastomers, such as urethane, silicone, or rubber. Examples of suitable cores can be found in U.S. Pat. Nos. 8,677,599, and 7,963,868, along with US2018/0043226, each of which are fully incorporated herein by reference for all non-limiting purposes.

And, also in this example, the 3D braided material will maintain a similar thickness throughout the length of the blade, and the angle of the tapes in the braided material changes to accommodate for any variations in geometry or dimension of the blade. Yet in other examples, the angles of the fibers can vary independently of the geometry of the blade or the angles of the fibers can stay constant regardless of the geometry of the blade to optimize the performance of certain region. Moreover, it may be advantageous to vary the thickness of the 3D braided material in various positions within the blade, for example increasing the thickness of the 3D braided material at the bottom edge and on the front face of the blade to increase durability.

In one example, the blade and shaft can be formed together by 3D braiding. In one example, a mandrel can be attached to a foam piece and the 3D braid can be applied over the mandrel and foam piece. In this example, the foam piece may be attached to the mandrel with adhesive spray foam, tape, or pre-impregnated fibers, for example. The mandrel can be removed, and the foam piece can be maintained in the blade region. The foam piece then remains inside the blade region in order to serve as a core for the blade of the stick. The complete blade and shaft can then be molded either before or after the mandrel is removed. In any of these examples, the 3D braiding allows the blade and shaft to be formed integrally prior to the molding operation.

In another example, the shaft can be 3D braided on a mandrel and then the shaft can be molded. After the shaft is molded, foam can be added to the end of the shaft and then 3D braiding can be applied to the blade. The blade can then be molded in order to form an integrally formed blade and shaft.

In another example, the blade and shaft can be formed separately. For example, 3D braiding can be applied to a piece of foam forming the core of the blade to form the blade. And 3D braiding can be applied over a mandrel to form the shaft. The blade and the shaft can then be placed into a mold and secured together in a co-molding operation. Again, the fibers forming the 3D braids of the blade and the shaft can be a prepreg material or alternatively the fibers can be a dry fiber where resin is injected into the mold during the molding operation. U.S. Pat. No. 10,315,082 provides examples of co-molding and is fully incorporated herein by reference for all non-limiting purposes.

In another example, a bladder or mandrel could be inserted into a 3D braided portion forming the shaft, and a foam core could be inserted into the wider side of the 3D braided portion forming the blade. In one example, the open wide side (where the core may be inserted) can be be folded and stitched to limit the foam core's movements and improve mechanical properties. Yet having the folded braid or closing the braid at this section can, in certain examples, be more advantageous than leaving the braid open at the wide end because the front and back layers would not be linked at this section. The blade and the shaft can then be molded together. An interface of the sections forming the shaft and the blade could be tightened or stitched together to ensure that the blade does not move relative to the shaft during the molding operation.

In the above examples, the cross-section of the shaft may change from the distal end of the shaft to the proximal end of the shaft where the shaft meets the blade. For instance, the distal end can be a first diameter which is larger than the proximal end. To accommodate for the change in the cross-section from the distal end of the shaft to the proximal end, different mandrel pieces may be used in conjunction with the above examples. Also in the above examples, fibers forming the 3D braided material of the shaft and/or the blade can be a prepreg material or alternatively the fibers can be a dry fiber where resin is injected into the mold during the molding operation. It is also contemplated that combinations of both dry fibers and pre-preg fibers can be used in the blade and shaft portions. Additionally, in conjunction with the above examples, various bladders may be used in either the shaft portion or the blade portion to form the desired shapes.

In another example, a sporting implement may include a first plurality of tapes extending in a warp direction, and a second plurality of tapes extending in a weft direction. The first plurality of tapes can form an intersection with the second plurality of tapes and the first plurality of tapes can form four intersections with the second plurality of tapes. The first plurality of tapes and the second plurality of tapes may also extend in the z direction. At least two of the first plurality of tapes can be oriented at a first and second angle relative to the z-axis, and at least two of the second plurality of tapes can be oriented at a first and second angle relative to the z-axis.

The first angle of at least two of the first plurality of tapes can be greater than 20° from the z-axis and the second angle can be less than −20° from the z-axis, and the first angle of the at least two of the second plurality of tapes can be greater than 20° from the z-axis and the second angle can be less than −20° from the z-axis. In another example, the first angle of at least two of the first plurality of tapes can be 45° from the z-axis and the second angle can be −45° from the z-axis. Moreover, the first angle of the at least two of the second plurality of tapes can be 45° from the z-axis, and the second angle can −45° from the z-axis. The first plurality of tapes can alternatingly extend at a first angle and a second angle relative to the z-axis, and the second plurality of tapes can alternatingly extend at a first angle and a second angle relative to the z-axis.

In another example, a method of forming a sporting implement may include one or more of the following steps: forming a first 3D woven material for a first end of the sporting implement and forming a second 3D woven material for a second end of the sporting implement, forming the first 3D woven material of a first layer and a second layer. The first layer and the second layer may include a first plurality of tapes extending in the X direction and a second plurality of tapes extending in the Y direction and a third plurality of tapes extending in the Z direction interconnecting the first layer and the second layer.

The method may also include forming the second 3D woven material of a first layer and a second layer the first layer and the second layer may include a first plurality of tapes extending in the X direction and a second plurality of tapes extending in the Y direction and a third plurality of tapes extending in the Z direction interconnecting the first layer and the second layer. The number of third tapes extending in the Z direction in the first 3D woven material can be less than the number of third tapes extending in the Z direction in the second 3D woven material.

The method may also include weaving the plurality of third tapes in the first 3D woven material and the plurality of third tapes in the second 3D woven material in the X direction, weaving the plurality of third tapes at a first angle relative to the first layer in the first 3D woven material, and weaving the plurality of third tapes at a second angle relative to the first layer in the second 3D woven material. The first angle can be less than the second angle. The plurality of second tapes can be greater than the plurality of first tapes in the first woven material. The plurality of first tapes can also be greater than the plurality of second tapes in the second woven material. The plurality of first tapes in the first woven material can be equal to the plurality of first tapes in the second woven material, and the plurality of second tapes in the first woven can be equal to the plurality of second tapes in the second woven material.

The method may also include orienting the first layer and the second layer of the first woven material at different angles relative to each other, and orienting the first layer and the second layer of the first woven material in the range of 5° to 75° in relation to a longitudinal direction. The method may also include orienting the first layer and the second layer of the second woven material at different angles, and orienting the first layer and the second layer of the second woven material in the range of 5° to 75° in relation to a longitudinal direction. The method may also include providing the first 3D woven material with a first number of loops interconnecting the first plurality of tapes extending in the X direction with the second plurality of tapes extending in the Y direction and providing the second 3D woven material with a second number of loops interconnecting the first plurality of tapes extending in the X direction with the second plurality of tapes extending in the Y direction. The first number of loops can be less than the second number of loops.

In one example, a sporting implement may include a shaft having a first end and a second end, a 3D braided material shaped to the dimension of the shaft. The 3D braided material may extend substantially from the first end to the second end of the shaft. And the 3D braided material can include a first plurality of plurality of tapes extending in the X direction only, a plurality of braiding tapes extending in the X, Y and Z directions. The 3D braided material can have a substantially consistent thickness from the first end to the second end of the shaft. The first plurality of tapes extending in the X direction may only extend at an angle of about 0° in the X direction in relation to the longitudinal direction. Also the ±angle of the second plurality of braiding tapes can remain substantially consistent throughout the thickness of the 3D woven material when the dimension of the shaft remains uniform. In another example, the ±angle of the second plurality of braiding tapes can be modified to correspond to changes in the dimension of the shaft and maintain a consistent thickness of the 3D woven material. The number of fibers in each tow of the first plurality of tapes may extend in the X direction only and the second plurality of braiding tapes can range from about 3,000 to about 24,000. The angle of the second plurality of braiding tapes can range from about 19° to about 60° in relation to a longitudinal direction. The angle of the second plurality of braiding tapes can range from about 30° to about 45° in relation to a longitudinal direction.

The number of tapes in the first plurality of tapes extending in the X direction can be the same as the number of tapes in the second plurality of braiding tapes. The first end can have a reduced diameter portion and a blade is connected to the first end. The blade can be formed of a 3D braided material, and the 3D braided material of the blade may maintain a substantially similar thickness throughout the length of the blade.

In another example, a sporting implement can include a shaft having a first end and a second end, and a 3D braided material forming the shaft. The 3D braided material may extend substantially the length of the shaft, from the first end to the second end of the shaft. The 3D braided material may include a plurality of tapes extending in the X direction only, and a plurality of braiding tapes extending in the X, Y and Z direction. The number of tapes in the plurality of tapes extending in the X direction only may be the same as the number of tapes in the plurality of braiding tapes. The 3D braided material can have a consistent thickness from the first end to the second end of the shaft. The first end may have a reduced diameter portion and a blade can be connected to the first end.

In another example, a sporting implement can include a shaft having a first end and a second end. The shaft can include a plurality of sides selected from the group consisting of four sides, five sides or seven sides. A 3D braided material may form the shaft and the 3D braided material can have a substantially consistent thickness throughout the length of the shaft. The angle of braiding tapes may vary to accommodate for variations in the geometry of the shaft. The first end can have a reduced diameter portion and a blade can be connected to the first end.

In another example, a composite sporting implement may include a shaft having a distal portion, a middle portion and a proximal portion. The shaft may include a 3D braided material, the 3D braided material maintaining substantially the same thickness from the distal portion to the middle portion and to the proximal portion. A perimeter length of the shaft can dynamically change along a length of the shaft from the distal portion to the middle portion and to the proximal portion. The 3D braided material may have a plurality of warp fibers and a plurality of braiding fibers extending in a X, Y, and Z direction. The plurality of braiding fibers may define a first angle relative to the plurality of warp fibers in a XY plane and the same plurality of braiding fibers can define a second angle in a XZ plane relative to the plurality of warp fibers. The first angle and second angle can remain constant along the shaft from the distal portion to the middle portion and to the proximal portion despite the perimeter length of the shaft dynamically changing along the length of the shaft from the distal portion to the middle portion and to the proximal portion. The proximal portion can have a reduced diameter and a blade may be connected to the proximal portion.

In another example, a composite sporting implement can include a shaft having a distal portion, a middle portion and a proximal portion. The shaft can include a 3D braided material, the 3D braided material can maintain a similar thickness from the distal portion to the middle portion and to the proximal portion. A perimeter length of the shaft may dynamically change along a length of the shaft from the distal portion to the middle portion and to the proximal portion. The 3D braided material may have a plurality of warp fibers and a plurality of braiding fibers. The plurality of braiding fibers can define a first angle relative to the plurality of warp fibers in a XY plane, and the same plurality of braiding fibers may define a second angle in a XZ plane relative to the plurality of warp fibers. The first angle and the second angle can both be larger at the distal portion of the shaft than at the middle portion of the shaft, and the first angle and the second angle at the distal portion may be approximately equal to the first angle and the second angle at the proximal portion of the shaft despite the perimeter length of the shaft dynamically changing along the length of the shaft from the distal portion to the middle portion and to the proximal portion. The proximal portion can have a reduced diameter and a blade can be connected to the proximal portion.

In another example, a composite hockey stick shaft can include a distal portion, a middle portion and a proximal portion. The shaft may include a 3D braided material, and the 3D braided material can maintain a similar thickness from the distal portion to the middle portion and to the proximal portion. A perimeter length of the shaft can dynamically change along a length of the shaft from the distal portion to the middle portion and to the proximal portion. The 3D braided material may have a plurality of warp fibers and a plurality of braiding fibers. The plurality of braiding fibers can define a first angle relative to the plurality of warp fibers in a XY plane and the same plurality of braiding fibers may define a second angle in a XZ plane relative to the plurality of warp fibers. And the first angle and the second angle may be both larger at the distal portion of the shaft than at the middle portion of the shaft. And the first angle and the second angle at the middle portion are both greater than the first angle and the second angle at the distal portion of the shaft. The first angle and the second angle can vary with the perimeter length of the shaft dynamically changing along the length of the shaft from the distal portion to the middle portion and to the proximal portion. The proximal portion can have a reduced diameter and a blade can be connected to the proximal portion.

In another example, a method may include forming a blade portion by 3D braiding. The 3D braiding may have a plurality of warp fibers and a plurality of braiding fibers. The plurality of braiding fibers may define a first angle relative to the plurality of warp fibers in a XY plane and the same plurality of braiding fibers may define a second angle in a XZ plane relative to the plurality of warp fibers. The first angle and the second angle can dynamically change along the length of the blade portion from a heel portion to a middle portion and from the middle portion to a toe portion. The method may also include forming a shaft portion by 3D braiding. The 3D braiding can have a plurality of warp fibers and a plurality of braiding fibers. The plurality of braiding fibers may define a first angle relative to the plurality of warp fibers in a XY plane and the same plurality of braiding fibers may define a second angle in a XZ plane relative to the plurality of warp fibers. The first angle and the second angle can be both larger at a distal portion of the shaft than at a middle portion of the shaft and the first angle and the second angle at the middle portion can be both greater than the first angle and the second angle at the distal portion of the shaft. The first angle and the second angle may vary with a perimeter length of the shaft dynamically changing along a length of the shaft from the distal portion to the middle portion and to a proximal portion.

The method may also include forming a shaft portion by 3D braiding. The 3D braiding can have a plurality of warp fibers and a plurality of braiding fibers. The plurality of braiding fibers can define a first angle relative to the plurality of warp fibers in a XY plane and the same plurality of braiding fibers can define a second angle in a XZ plane relative to the plurality of warp fibers. The first angle and the second angle can be both larger at a distal portion of the shaft than at a middle portion of the shaft. And the first angle and the second angle at the distal portion can be approximately equal to the first angle and the second angle at a proximal portion of the shaft despite a perimeter length of the shaft dynamically changing along a length of the shaft from the distal portion to the middle portion and to the proximal portion. The method may also include forming a shaft portion by 3D braiding. The 3D braiding forming the shaft may include a plurality of warp fibers and a plurality of braiding fibers. The 3D braiding can define a first angle relative to the plurality of warp fibers in a XY plane and the same plurality of braiding fibers define a second angle in a XZ plane relative to the plurality of warp fibers and wherein the first angle and second angle remain constant along the shaft from the distal portion to the middle portion and to the proximal portion despite the perimeter length of the shaft dynamically changing along the length of the shaft from the distal portion to the middle portion and to the proximal portion.

In another example, a blade can include a heel portion, a middle portion, a toe portion, and a core portion. A 3D braided material can be wrapped around the core portion, and the 3D braided material may include a plurality of warp fibers and a plurality of braiding fibers extending in a X, Y, and Z direction. The plurality of braiding fibers can define a first angle relative to the plurality of warp fibers in a XY plane and the same plurality of braiding fibers can define a second angle in a XZ plane relative to the plurality of warp fibers. The first angle and second angle remain constant from the heel portion to the middle portion and from the middle portion to the toe portion.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A method comprising:
   forming a blade portion by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; and wherein the first angle and the second angle dynamically change along a length of the blade portion from a heel portion to a middle portion and from the middle portion to a toe portion.

2. The method of claim 1 further comprising forming a shaft portion by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; wherein the first angle and the second angle are both larger at a distal portion of the shaft than at a middle portion of the shaft and the first angle and the second angle at the middle portion are both greater than the first angle and the second angle at the distal portion of the shaft and wherein the first angle and the second angle vary with a perimeter length of the shaft dynamically changing along a length of the shaft from the distal portion to the middle portion and to a proximal portion.

3. The method of claim 1 further comprising forming a shaft portion by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; wherein the first angle and the second angle are both larger at a distal portion of the shaft than at a middle portion of the shaft, and the first angle and the second angle at the distal portion are approximately equal to the first angle and the second angle at a proximal portion of the shaft despite a perimeter length of the shaft dynamically changing along a length of the shaft from the distal portion to the middle portion and to the proximal portion.

4. The method of claim 1 further comprising forming a shaft portion by 3D braiding; wherein the 3D braiding has a plurality of warp fibers and a plurality of braiding fibers; wherein the 3D braiding defines a first angle relative to the plurality of warp fibers in a XY plane and the same plurality of braiding fibers define a second angle in a XZ plane relative to the plurality of warp fibers and wherein the first angle and second angle remain constant along the shaft from a distal portion to the middle portion and to a proximal portion despite a perimeter length of the shaft dynamically changing along a length of the shaft from the distal portion to the middle portion and to the proximal portion.

5. A sporting implement comprising:
   a blade portion formed by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; and wherein the first angle and the second angle dynamically change along a length of the blade portion from a heel portion to a middle portion and from the middle portion to a toe portion.

6. The sporting implement of claim 5 further comprising a shaft portion formed by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; wherein the first angle and the second angle are both larger at a distal portion of the shaft than at a middle portion of the shaft and the first angle and the second angle at the middle portion are both greater than the first angle and the second angle at the distal portion of the shaft and wherein the first angle and the second angle vary with a perimeter length of the shaft dynamically changing along a length of the shaft from the distal portion to the middle portion and to a proximal portion.

7. The sporting implement of claim 5 further comprising a shaft portion formed by 3D braiding wherein the 3D braiding has a plurality of warp fibers and a plurality of braiding fibers; wherein the plurality of braiding fibers define a first angle relative to the plurality of warp fibers in a XY plane and the same plurality of braiding fibers define a second angle in a XZ plane relative to the plurality of warp fibers; wherein the first angle and the second angle are both larger at a distal portion of the shaft than at a middle portion of the shaft, and the first angle and the second angle at the distal portion are approximately equal to the first angle and the second angle at a proximal portion of the shaft despite a perimeter length of the shaft dynamically changing along a length of the shaft from the distal portion to the middle portion and to the proximal portion.

8. The sporting implement of claim 5 further comprising a shaft portion formed by 3D braiding; wherein the 3D braiding has a plurality of warp fibers and a plurality of braiding fibers; wherein the 3D braiding defines a first angle relative to the plurality of warp fibers in a XY plane and the same plurality of braiding fibers define a second angle in a XZ plane relative to the plurality of warp fibers and wherein the first angle and second angle remain constant along the shaft from a distal portion to the middle portion and to a proximal portion despite a perimeter length of the shaft dynamically changing along a length of the shaft from the distal portion to the middle portion and to the proximal portion.

* * * * *